(12) United States Patent
Cseri et al.

(10) Patent No.: US 11,106,658 B2
(45) Date of Patent: Aug. 31, 2021

(54) TASK SCHEDULING IN DATABASE SYSTEMS

(71) Applicant: Snowflake Inc., Bozeman, MT (US)

(72) Inventors: Istvan Cseri, Seattle, WA (US);
Torsten Grabs, Seattle, WA (US);
Benoit Dageville, Foster City, CA (US)

(73) Assignee: Snowflake Inc., Bozeman, MT (US)

( * ) Notice: Subject to any disclaimer, the term of this patent is extended or adjusted under 35 U.S.C. 154(b) by 143 days.

(21) Appl. No.: 16/203,322

(22) Filed: Nov. 28, 2018

(65) Prior Publication Data

US 2020/0167340 A1    May 28, 2020

(51) Int. Cl.
*G06F 16/23*  (2019.01)
*G06F 9/46*   (2006.01)

(52) U.S. Cl.
CPC .......... *G06F 16/2379* (2019.01); *G06F 9/466* (2013.01); *G06F 16/2308* (2019.01)

(58) Field of Classification Search
CPC ... G06F 16/2379; G06F 9/466; G06F 16/2308
See application file for complete search history.

(56) References Cited

U.S. PATENT DOCUMENTS

| | | | |
|---|---|---|---|
| 8,682,859 B2 | 3/2014 | Gutlapalli et al. | |
| 9,547,651 B1* | 1/2017 | Ahmed | G06F 16/11 |
| 9,753,935 B1* | 9/2017 | Tobin | G06F 16/1727 |
| 10,204,130 B2* | 2/2019 | Mohandas | G06F 16/2365 |
| 10,359,937 B2 | 7/2019 | Rozental | |
| 2008/0098045 A1* | 4/2008 | Radhakrishnan | G06F 16/284 |
| 2008/0307011 A1 | 12/2008 | Chen et al. | |
| 2012/0207075 A1* | 8/2012 | Nagaraj | H04H 20/86 370/312 |
| 2014/0149656 A1* | 5/2014 | Cheriton | G06F 3/0673 711/108 |
| 2014/0372489 A1 | 12/2014 | Jaiswal et al. | |
| 2015/0026114 A1* | 1/2015 | Triff | G06F 16/254 707/602 |

(Continued)

FOREIGN PATENT DOCUMENTS

WO    WO-2020112663 A1    6/2020

OTHER PUBLICATIONS

U.S. Appl. No. 16/705,533, filed Dec. 6, 2019, Task Scheduling in Database Systems.

(Continued)

*Primary Examiner* — James Trujillo
*Assistant Examiner* — Michal Bogacki
(74) *Attorney, Agent, or Firm* — Schwegman Lundberg & Woessner, P.A.

(57) ABSTRACT

Systems, methods, and devices for executing a task on database data in response to a trigger event are disclosed. A method includes executing a transaction on a table comprising database data, wherein executing the transaction comprises generating a new table version. The method includes, in response to the transaction being fully executed, generating a change tracking entry comprising an indication of one or more modifications made to the table by the transaction and storing the change tracking entry in a change tracking stream. The method includes executing a task on the new table version in response to a trigger event.

34 Claims, 15 Drawing Sheets

(56) References Cited

U.S. PATENT DOCUMENTS

| | | | |
|---|---|---|---|
| 2016/0267015 A1 | 9/2016 | Li et al. | |
| 2018/0046643 A1* | 2/2018 | Brodt | G06F 16/2457 |
| 2018/0253468 A1* | 9/2018 | Gurajada | G06F 3/061 |
| 2018/0374392 A1* | 12/2018 | Ollivier | G06Q 20/4014 |
| 2019/0392061 A1* | 12/2019 | Terry | G06F 16/2308 |
| 2020/0167343 A1 | 5/2020 | Cseri et al. | |

OTHER PUBLICATIONS

"U.S. Appl. No. 16/705,533, Examiner Interview Summary dated May 4, 2020", 3 pgs.

"U.S. Appl. No. 16/705,533, Non Final Office Action dated Feb. 13, 2020".

"U.S. Appl. No. 16/705,533, Response Filed May 8, 2020 to Non Final Office Action dated Feb. 13, 2020", 14 pgs.

"International Application Serial No. PCT/US2019/063057, International Search Report dated Feb. 6, 2020", 2 pgs.

"International Application Serial No. PCT/US2019/063057, Written Opinion dated Feb. 6, 2020", 5 pgs.

"U.S. Appl. No. 16/705,533, Advisory Action dated Apr. 5, 2021", 3 pgs.

"U.S. Appl. No. 16/705,533, Examiner Interview Summary dated Mar. 9, 2021", 2 pgs.

"U.S. Appl. No. 16/705,533, Final Office Action dated Jan. 22, 2021", 9 pgs.

"U.S. Appl. No. 16/705,533, Response filed Mar. 11, 2021 to Final Office Action dated Jan. 22, 2021", 12 pgs.

\* cited by examiner

Micro-Partition 2

Deleting Rows From Table
700

| COLUMN 1 | COLUMN 2 | METADATA NAME | METADATA ROW |
|---|---|---|---|
| 1 | value1 | NULL (MP2) | NULL (1) |
| 2 | value2 | NULL (MP2) | NULL (2) |
| 3 | value3 | NULL (MP2) | NULL (3) |
| 4 | value4 | NULL (MP2) | NULL (3) |

Deleting rows 2 and 3

Micro-Partition 4

| COLUMN 1 | COLUMN 2 | METADATA NAME | METADATA ROW |
|---|---|---|---|
| 1 | value1 | MP2 | 1 |
| 4 | value4 | MP2 | 4 |

DELTA 710

Delta Information After Delete
710

| COLUMN 1 | COLUMN 2 | METADATA ACTION | METADATA IS UPDATE |
|---|---|---|---|
| 2 | value2 | DELETE | FALSE |
| 3 | value3 | DELETE | FALSE |

FIG. 7

Inserting Rows Into Table
800

Micro-Partition 3

| COLUMN 1 | COLUMN 2 | METADATA NAME | METADATA ROW |
|---|---|---|---|
| 21 | value21 | NULL (MP3) | NULL (1) |
| 22 | value22 | NULL (MP3) | NULL (2) |
| 23 | value23 | NULL (MP3) | NULL (3) |

Inserting rows 17 and 18

Micro-Partition 5

| COLUMN 1 | COLUMN 2 | METADATA NAME | METADATA ROW |
|---|---|---|---|
| 21 | value21 | MP3 | 1 |
| 22 | value22 | MP3 | 2 |
| 23 | value23 | MP3 | 3 |
| 17 | value17 | NULL | NULL |
| 18 | value18 | NULL | NULL |

Delta Information After Inserting Rows
810

DELTA 810

| COLUMN 1 | COLUMN 2 | METADATA ACTION | METADATA IS UPDATE |
|---|---|---|---|
| 17 | value17 | INSERT | FALSE |
| 18 | value18 | INSERT | FALSE |

FIG. 8

Updating Rows In Table 900

Micro-Partition 78

| COLUMN 1 | COLUMN 2 | METADATA NAME | METADATA ROW |
|---|---|---|---|
| 1 | value1 | NULL (MP78) | NULL (1) |
| 2 | value2 | NULL (MP78) | NULL (2) |
| 3 | value3 | NULL (MP78) | NULL (3) |
| 4 | value4 | NULL (MP78) | NULL (3) |

Updating rows 1 and 4 to new values

Micro-Partition 91

| COLUMN 1 | COLUMN 2 | METADATA NAME | METADATA ROW |
|---|---|---|---|
| 1 | VALUE11 | MP78 | 1 |
| 2 | value2 | MP78 | 2 |
| 3 | value3 | MP78 | 3 |
| 4 | VALUE44 | MP78 | 4 |

DELTA 910

Delta Information After Updating Rows In Table 910

| COLUMN 1 | COLUMN 2 | METADATA ACTION | METADATA IS UPDATE |
|---|---|---|---|
| 1 | value1 | DELETE | TRUE |
| 4 | value4 | DELETE | TRUE |
| 1 | VALUE11 | INSERT | TRUE |
| 4 | VALUE44 | INSERT | TRUE |

FIG. 9

TASK SCHEDULING IN DATABASE SYSTEMS

TECHNICAL FIELD

The present disclosure relates to systems, methods, and devices for databases and more particularly relates to scheduling tasks to be executed on database data.

BACKGROUND

Databases are widely used for data storage and access in computing applications. Databases may include one or more tables that include or reference data that can be read, modified, or deleted using queries. Databases can store anywhere from small to extremely large sets of data within one or more tables. This data can be accessed by various users in an organization or even be used to service public users, such as via a website or an application program interface (API). Both computing and storage resources, as well as their underlying architecture, can play a significant role in achieving desirable database performance.

Tasks or commands can be executed on database data to manipulate or alter the data. Such tasks can be requested by a client account and may manipulate database data to make it more useful for the client account. In certain implementations, it may be beneficial to schedule the automatic execution of certain tasks to streamline database systems.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 7 is a block diagram illustrating a delete command performed on a micro-partition of a database, according to one embodiment;

FIG. 8 is a block diagram illustrating an insert command performed on a micro-partition of a database, according to one embodiment;

FIG. 9 is a block diagram illustrating an update command performed on a micro-partition of a database, according to one embodiment;

DETAILED DESCRIPTION

Figure 1:
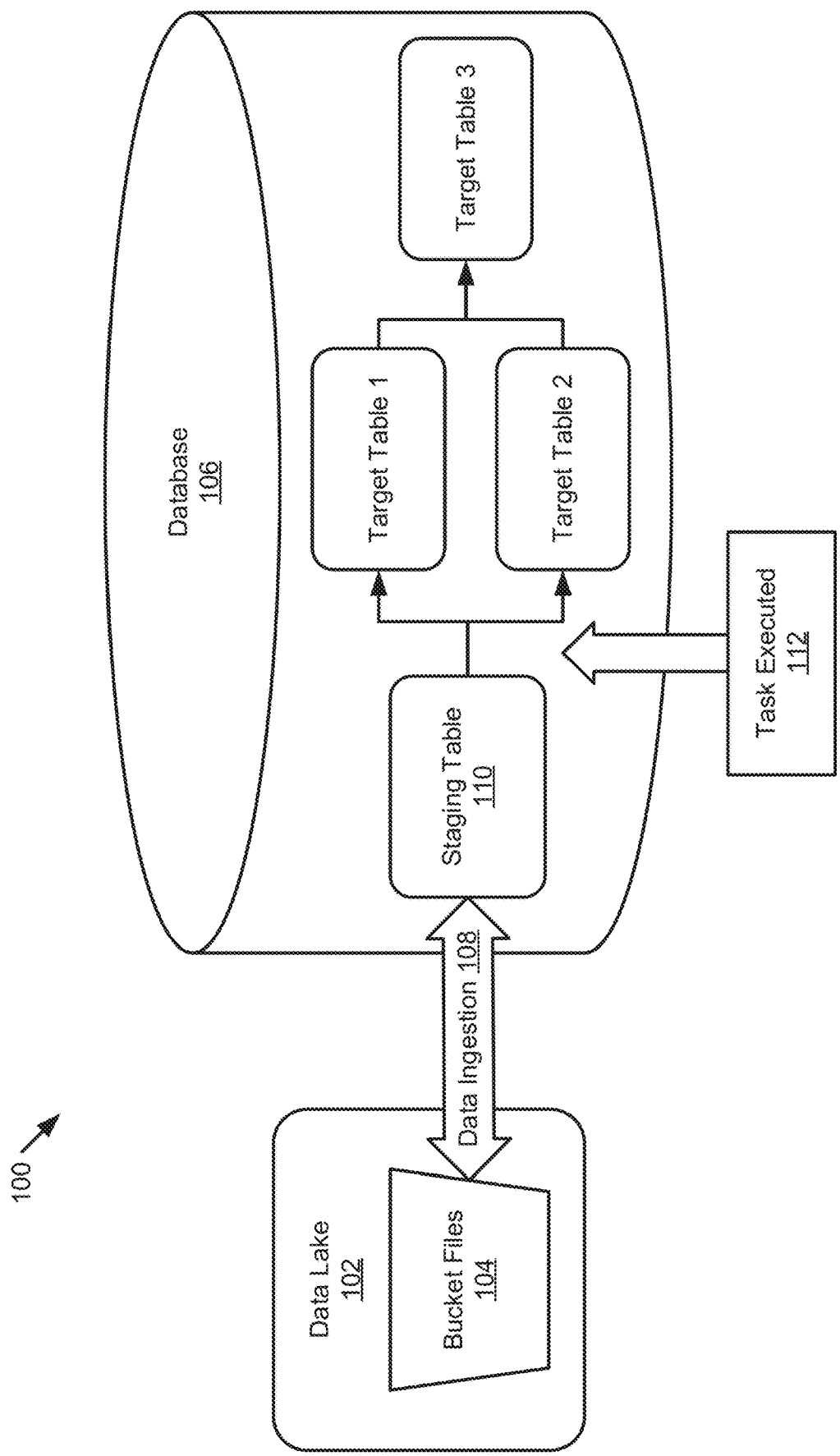
FIG. 1 is a schematic block diagram of a process flow for data ingestion, according to one embodiment.

Systems, methods, and devices for scheduling tasks to be executed on database data are disclosed. Tasks, such as structured query language (SQL) statements, can be executed on database data to manipulate or alter the data. A task may include any function and may include user-defined logic received from a client account. In certain implementations, it may be beneficial to schedule the automatic execution of a task in response to one or more trigger events. In an embodiment, task execution can be triggered by the complete execution of a transaction such as inserting, deleting, or updating database data.

Transactions, such as INSERT, DELETE, MERGE, or UPDATE commands can be executed on a database table. It can be beneficial to track changes that have occurred on a database table and, in certain embodiments, trigger a task to be executed on a database table in response to a transaction that has been executed on the table. Change tracking is historically very costly and requires significant resources and storage capacity. As disclosed herein, a change tracking stream may be generated that indicates one or more versions of a database table and how the table has been modified over time. The change tracking stream provides a low-cost means for summarizing all transactions that have been executed on the table over time and when those transactions occurred.

Tasks, such as user-defined logic or SQL statements, may be executed on database data in response to a trigger event. In an embodiment, a task is executed in response to the change tracking stream advancing after a transaction has been fully executed on the database data. This can provide significant benefits over other task scheduling means known in the art by ensuring that the task is executed on a particular set of data only one time and further by ensuring that a task is executed on all newly ingested data. In an embodiment, this is made possible by a change tracking system in the database that generates a change tracking stream. The change tracking stream participates in transactions similar to table data such that the change tracking stream will advance if and when the transaction commits or otherwise stays unmodified.

A database table may store data in a plurality of micro-partitions, wherein the micro-partitions are immutable storage devices. When a transaction is executed on a such a table, all impacted micro-partitions are recreated to generate new micro-partitions that reflect the modifications of the transaction. After a transaction is fully executed, any original micro-partitions that were recreated may then be removed from the database. A new version of the table is generated after each transaction that is executed on the table. The table may undergo many versions over a time period if the data in the table undergoes many changes, such as inserts, deletes, updates, and/or merges. Each version of the table may include metadata indicating what transaction generated the table, when the transaction was ordered, when the transaction was fully executed, and how the transaction altered one or more rows in the table. The disclosed systems, methods, and devices for low-cost table versioning may be leveraged to provide an efficient means for triggering tasks to be executed on database data in response to a modification made to the data.

Change tracking information can be stored as metadata in a database. This metadata describes the data that is stored in database tables of customers but is not actually the stored table data. Metadata can get very large, especially if there are large database tables of many customers. Current database systems have severe limitations handling large amounts of metadata. Current database systems store metadata in mutable storage devices and services, including main memory, file systems, and key-value stores. These devices and services allow the metadata to be updated data in-place. If a data record changes, it may be updated with the new information and the old information is overwritten. This allows databases to easily maintain mutable metadata by updating metadata in-place.

However, these mutable storage devices and services have limitations. The limitations are at least two-fold. First, mutable storage devices such as main memory and file systems have a hard limit in terms of storage capacity. If the size of the metadata exceeds these limits, it is impossible to store more metadata there. Second, mutable storage services such as key-value stores perform poorly when reading large volumes of metadata. Reading data is performed using range scans, which take a long time to finish. In practice, range scans can take many minutes or even approach an hour to complete in large scale deployments.

These limitations make it impossible to store large amounts of metadata in existing mutable storage devices and services. Systems, methods, and devices disclosed herein provide for improved metadata storage and management that includes storing metadata in immutable (non-mutable) storage such as micro-partitions. As used herein, immutable or non-mutable storage includes storage where data cannot or is not permitted to be overwritten or updated in-place. For example, changes to data that is located in a cell or region of storage media may be stored as a new file in a different, time-stamped, cell or region of the storage media. Mutable storage may include storage where data is permitted to be overwritten or updated in-place. For example, data in a given cell or region of the storage media can be overwritten when there are changes to the data relevant to that cell or region of the storage media.

In one embodiment, metadata is stored and maintained on non-mutable storage services in the cloud. These storage services may include, for example, Amazon S3®, Microsoft Azure Blob Storage®, and Google Cloud Storage®. Many of these services do not allow to update data in-place (i.e., are non-mutable or immutable). Data files may only be added or deleted, but never updated. In one embodiment, storing and maintaining metadata on these services requires that, for every change in metadata, a metadata file is added to the storage service. These metadata files may be periodically consolidated into larger "compacted" or consolidated metadata files in the background.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 1000 MB of uncompressed data (note that the actual size in storage may be smaller because data may be stored compressed). Groups of rows in tables may be mapped into individual micro-partitions organized in a columnar fashion. This size and structure allow for extremely granular pruning of very large tables, which can be comprised of millions, or even hundreds of millions, of micro-partitions. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description to provide a thorough understanding of the embodiments disclosed herein, some embodiments may be practiced without some or all these details. Moreover, for the purpose of clarity, certain technical material that is known in the related art has not been described in detail to avoid unnecessarily obscuring the disclosure.

In an embodiment, a method for scheduling tasks to be executed on a database is disclosed. The method includes executing a transaction on a table comprising database data, wherein executing the transaction comprises generating a new table version. The method includes, in response to the transaction being fully executed, generating a change tracking entry comprising an indication of one or more modifications made to the table by the transaction and storing the change tracking entry in a change tracking stream. The method includes executing a task on the new table version in response to a trigger event.

In an embodiment, the method further includes advancing a stream offset in the change tracking stream in response to the change tracking information consumed from the change tracking stream. In such an embodiment, a transaction (may include a set of statements participating in the transaction) may include the advancing of the stream offset. In an embodiment, the trigger event includes one or more of a predefined time period, a threshold number of modifications made to the table, availability of one or more change tracking entries in the change tracking stream, or the availability of change tracking entries in the change tracking stream plus a predefined time period.

In an embodiment, the transaction includes one or more of an insert, a delete, a merge, or an update executed on the database table. In an embodiment, data manipulation statements executing the transaction may include generating at least one new micro-partition that reflects the transaction and removing one or more existing micro-partitions that do not reflect the modifications made by the transaction. In an implementation where a plurality of new micro-partitions is generated based on one transaction, the change tracking information may include a plurality of change tracking entries with each of the plurality of change tracking entries being directed to a different micro-partition that was modified by the transaction. The change tracking information includes data pertaining to the transaction including, for example, an identity of a user or account that initiated the transaction, a timestamp when the transaction was requested, a timestamp when execution of the transaction began, a timestamp when execution of the timestamp was completed, a listing of all rows that were modified by the transaction and how those rows were modified, a listing of micro-partitions that were generated and/or removed based on the transaction, and any other suitable information relevant to the transaction. The change tracking information includes data in the micro-partitions to enable tracking the lineage of table rows across one or more micro-partitions. Table versioning information may include information about what micro-partitions are part of a particular table version, including what micro-partitions were added and removed. Table versioning information may further include transactional information including the beginning and ending timestamp of the transaction and/or query information including which user and what query was executed.

In an embodiment, the change tracking information includes information on what rows were modified by a transaction, what micro-partitions were modified by a transaction, how the rows and/or micro-partitions were modified by the transaction, information on prior modifications on the table, and so forth. The change tracking stream may include a lineage of modifications made on the table since the table was initially generated, or since a particular time. The change tracking stream may include a listing of table versions of the table, including all micro-partitions that are currently part of or were historically part of the table. The change tracking stream may be stored in its own micro-partition or may be stored as metadata within a micro-partition that includes database data.

In an embodiment, file metadata is stored within metadata storage. The file metadata contains table versions and information about each table data file. The metadata storage may include mutable storage (storage that can be over written or written in-place), such as a local file system, system, memory, or the like. In one embodiment, the micro-partition metadata consists of two data sets: table versions and file information. The table versions data set includes a mapping of table versions to lists of added files and removed files. File information consists of information about each micro-partition, including micro-partition path, micro-partition size, micro-partition key id, and summaries of all rows and columns that are stored in the micro-partition, for example. Each modification of the table creates new micro-partitions and new micro-partition metadata. Inserts into the table create new micro-partitions. Deletes from the table remove micro-partitions and potentially add new micro-partitions with the remaining rows in a table if not all rows in a micro-partition were deleted. Updates remove micro-partitions and replace them with new micro-partitions with rows containing the updated records.

In one embodiment, metadata, including a change tracking column, may be stored in metadata micro-partitions in immutable storage. In one embodiment, a system may write metadata micro-partitions to cloud storage for every modification of a database table. In one embodiment, a system may download and read metadata micro-partitions to compute the scan set. The metadata micro-partitions may be downloaded in parallel and read as they are received to improve scan set computation. In one embodiment, a system may periodically consolidate metadata micro-partitions in the background. In one embodiment, performance improvements, including pre-fetching, caching, columnar layout and the like may be included. Furthermore, security improvements, including encryption and integrity checking, are also possible with metadata files with a columnar layout.

FIG. 1 illustrates a schematic block diagram of a process flow 100 for ingesting and manipulating database data. The process flow 100 includes a data lake 102 that may include a data warehouse in an alternative embodiment. The data lake 102 includes bucket files 104 comprising one or more data entries to be ingested in the database 106. The data is ingested at 108 into the database 106 at a staging table 110. A task is executed at 112 on the data to transform the data into one or more target tables, such as target table 1, target table 2, and/or target table 3. The task may include, for example, user-defined business logic such as one or more transformations occurring to the database data such as a merge, an update, a delete, an insert, or other data manipulation language (DML) command, as well as any suitable multi-statement transaction or SQL statement. In an embodiment, the task is defined by a user and is applied in response to a trigger event such as a scheduled timer event.

The process flow 100 is such that data loaded from the data lake 102 may undergo additional processing when the task is executed at 112 before the data reaches its final destination table. A client account may provide a SQL statement or DML command to express the applicable processing logic for the task. In an embodiment as illustrated in FIG. 1, the task is executed on the data after it is loaded into the staging table 110 and before it reaches a final destination table, such as target table 1, target table 2, and/or target table 3. The staging table 110 may be utilized to load data in a continuous and serverless fashion. Data that has been ingested into the staging table 110 may be further modified by the task executed at 112 before the data reaches its one or more final destination target tables.

The task executed at 112 may be user-defined. Such tasks may include a stored procedure that provides means to define, for example, a sequence of SQL statements to be applied to the data that is ingested into the staging table 110. A change tracking stream may be leveraged to retrieve changes from a staging table 110 in a transaction manner and consume a delta between a first timestamp and a second timestamp only once. The task may be referred to as an object in the database 106 catalog and may incorporate control flow logic. The task may include a recurring task that is continuously processed as data is ingested and/or inputs are modified over time. The task may be executed in response to a trigger event.

Task scheduling can provide numerous benefits to database users and enable such users to schedule repeated tasks on ingested database data and/or schedule tasks in response to one or more trigger events. Tasks, such as those tasks executed at 112, provide a scheduling mechanism that may negate a need to resort to an external job for common scheduling needs for SQL jobs. Further, tasks enable staging tables 110 to be connected to downstream tables, such as target table 1, target table 2, and/or target table 3, with regularly processed logic that picks up new data from the staging table 110 and transforms the data into a shape required for the target table.

In an embodiment, a task such as the task executed at 112, may be received from a client account in the form of a SQL statement that defines one or more tasks to be performed on the ingested data. The task may be scheduled to be executed in response to a trigger event. One or more trigger events may cause execution of the task to repeat at predefined intervals or based on a predefined threshold. In an embodiment, the trigger event is the execution of a transaction on the database, wherein the transaction includes one or more of an insert, a delete, or an update to database data. In an embodiment, the trigger event is the advancing of a change tracking stream in response to a transaction being fully executed on a database table. In an embodiment, the trigger event is the advancing of the change tracking stream plus a predefined time interval, such as for example, 10 seconds after a change tracking entry has been added to the change tracking stream, 5 minutes after a change tracking entry has been added to the change tracking stream, and so forth. In an embodiment, such task scheduling may avoid scenarios where multiple incarnations of a task are executed at the same time.

In an embodiment, the task is part of the database schema. The task may include information on one or more of: a date the task was created, a name of the task, a database name the task should be applied to, a schema the task pertains to, a comment attached to the task, an owner or creator of the task, a date the task was first initiated, a schedule for the task, a connection string, a SQL script, a status for the task such as whether the task is running or stopped, a last execution time such as a timestamp for the last complete execution of the task, or a last execution status such as an indication whether the task was run successfully or an error the task returned if it could not be run successfully. In an embodiment, a task may be managed and/or modified by a user account after the task has been generated or executed.

In an embodiment, a task history is generated that indicates whether a task was successfully or unsuccessfully executed. The task history may include metadata about the data, including for example, a minimum/maximum value pair for the pertinent data, a timestamp when the pertinent data was ingested, a timestamp when the pertinent data was generated, and so forth. Additionally, the task history may include information on how the data was modified, when the data was modified, how long it took to execute the task, how much processing capacity was required to execute the task, and so forth. In an embodiment, start and end time parameters on the task history call are optional. In an embodiment, to align with behavior of similar history calls, the task history may report any suitable past time period, for example one week into the past, one month into the past, and so forth. In an embodiment, the task history includes one or more of: a task name, a task identification, an execution timestamp, and execution correlation identification, an execution status such as SUCCESS or ERROR that may include an error code, a message attached to the task, or results returned by a SQL statement that is executed by the task.

In an embodiment, a task, such as the task executed at 112, is an execution of SQL code that is embedded or referred to in the database 106. The task may be initiated based on a schedule defined by a user in a task definition. In an embodiment, a current schedule definition does not allow for overlapping executions of the same task definition. An execution of the task at 112 uses the context of the task to pick the execution context (e.g. database, schema, etc.).

A task schedule may include a WAIT condition or alternatively a SCHEDULE property that defines an expression to trigger time-based execution. Such time-based execution may include a simple interval definition or a CRON expression. The WAIT condition is an expression that is evaluated before executing the task. If the expression is evaluated to false, the task execution will be skipped. Such expressions can allow referring to a stream, such as a change tracking stream (see 202), that allows to reason about activity of one or several streams, for example to check whether the stream is empty or contains changes from underlying tables. A task may include a plurality of stream checks with AND and/or OR into a larger Boolean expression with a requirement that the Boolean expression be true for the SQL activity to be initiated.

In an embodiment, a task without the WAIT and SCHEDULE properties may indicate that the underlying system will execute the task in a continuous fashion using best effort based on an internal schedule, data change notifications, or simply using a continuous execution of a query defined in the task.

In an embodiment, multiple applications of the same task cannot overlap. In such an embodiment, if a previous task execution 112 is still processing, the next execution cannot yet be initiated. Instead, the next execution may be skipped, or it may be initiated at a later time based on a regular task schedule.

The process flow 100 may be implemented as an auto-ingest framework to load files efficiently into target tables. The process flow 100 may provide an improved ingestion pipeline over other implementations known in the art. In various implementations the process flow 100 may permit one or more of: data to be loaded from the initial staging table 110 into multiple other target tables, data to be loaded into the initial staging table 110 and then merged into other target tables, or the expression of complex workflows as one or more tasks are executed at 112. The process flow 100 may negate the need for a plurality of data ingestion pipelines and enable data to be directed to a plurality of target tables by way of a single auto ingestion pipeline. The process flow 100 provides a cost-effective means for ingesting data into multiple target tables that provides benefits over other approaches that utilize a COPY or MERGE command. Such approaches using a COPY or MERGE command may be problematic because MERGE is highly cost intensive and requires data to be clustered to be efficient. The process flow 100 disclosed herein provides an effective and cost-efficient means for ingesting data into multiple target tables and applying one or more tasks to ingested data.

In an embodiment, the task is executed at 112 is implemented as a continuous task. The continuous task may be some user-defined logic that executes continuously. The so-called "continuous" execution of the task at 112 may not be truly continuous but instead may include a discrete action that is evaluated and/or executed frequently enough that it appears continuous. A continuous task may include user-defined logic that represents a real task a client account wishes to execute. The continuous task may include an optional user-defined condition that determines if a task needs to be invoked at a certain time. The continuous task may further include an indication of a data warehouse where the continuous task should be executed.

In an embodiment, the task is executed at 112 only after the WAIT condition is satisfied. If no WAIT condition is specified, the task will proceed according to a task schedule. The trigger event may be unnecessary in certain implementations but may provide cost savings to evaluate the action and determine whether the task needs to be executed. In an embodiment, a WAIT condition is evaluated in the task execution context before the query is executed such that it must be an expression that can be evaluated in the query compilation environment. Various example WAIT conditions include: a predefined time period has passed since the start time of the previous execution of the task, a predefined time period has passed since the end time of the previous execution of the task, a status of the previous execution of the task, a predefined number of rows changed that are captured in the change tracking stream (see 506), or a timestamp of an earliest entry of the change tracking stream 506. In an embodiment, the task includes a plurality of trigger events. In various embodiments, the task may proceed after one of the trigger events is satisfied, after one or more particular trigger events are satisfied, after all trigger events are satisfied, and so forth.

Figure 2:
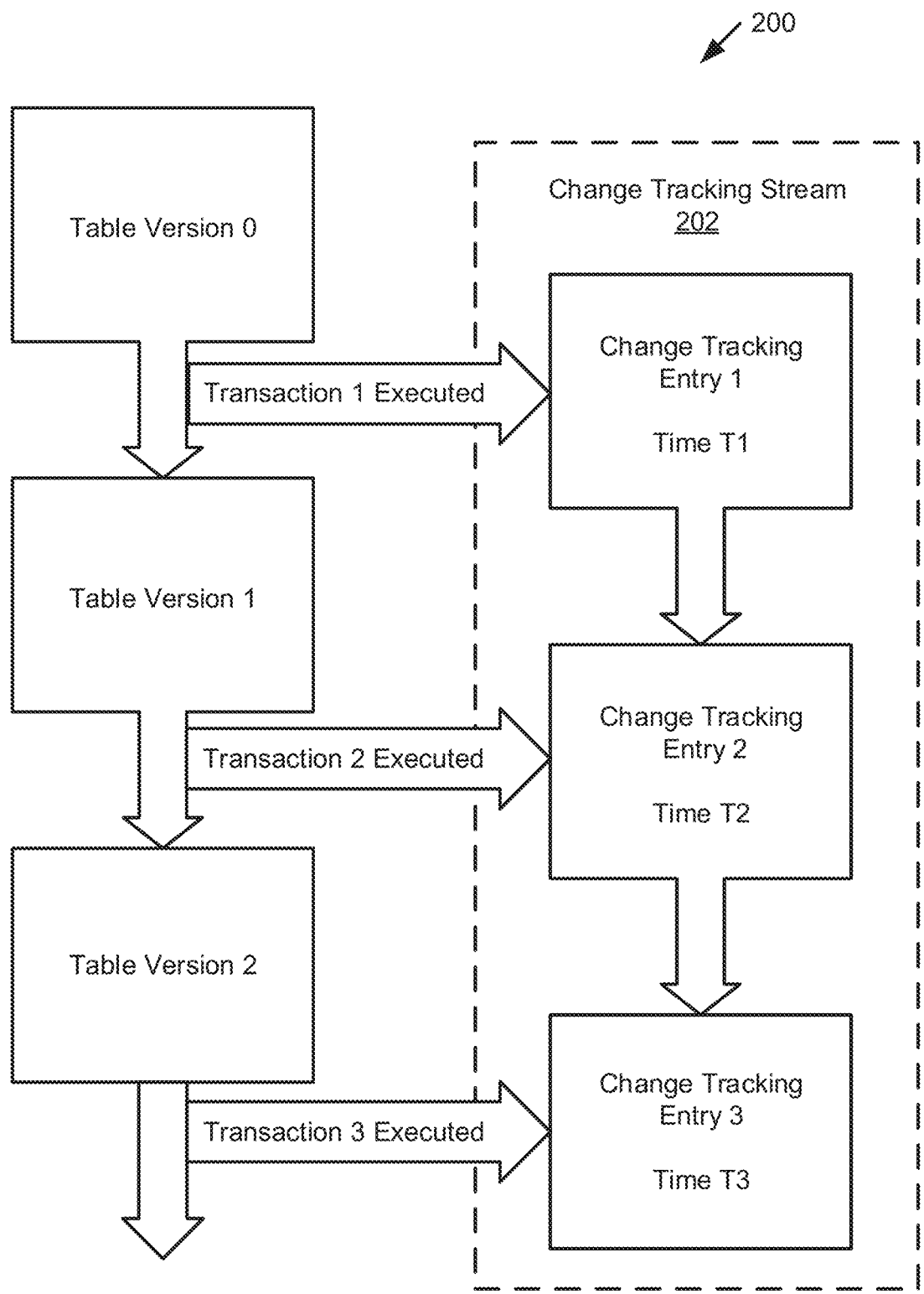
FIG. 2 is a schematic block diagram of a table history and change tracking stream, according to one embodiment.

FIG. 2 illustrates a schematic diagram of a table history 200 with multiple table versions and multiple entries to a change tracking stream 202. The table history 200 illustrates three table versions, namely table version 0, table version 1, and table version 2. The change tracking stream 202 includes three entries, namely change tracking entry 1, change tracking entry 2, and change tracking entry 3. Change tracking entry 1 is entered into the change tracking stream 202 at time T1. Change tracking entry 2 is entered into the change tracking stream 202 at time T2. Change tracking entry 3 is entered into the change tracking stream 202 at time T3. Each of the change tracking entries is entered into the change tracking stream 202 only upon completion of a transaction that is executed on the database table. Transaction 1 is 202 on table version 0 and change tracking entry 1 is entered into the change tracking stream 202 upon completion of transaction 1. Transaction 2 is executed on table version 2 and change tracking entry 2 is entered into the change tracking stream 202 upon completion of transaction 2. Transaction 3 is executed on table version 3 and change tracking entry 3 is entered into the change tracking stream 202 upon completion of transaction 3. In an embodiment, the change tracking stream 202 may further include a "change tracking entry 0" that includes metadata about an original version of the table.

The change tracking stream 202 is advanced i.e. a new change tracking entry is added, only after a transaction has been fully executed on the table. If a transaction is initiated on the table, but is cancelled or paused for any reason, a corresponding change tracking entry will not be generated and the change tracking stream 202 will not advance.

The change tracking stream 202 may be read to determine a delta for the table between a first timestamp and a second timestamp. Each of the change tracking entries includes an indication of a transaction that was executed on the table and further includes a timestamp for that transaction. A query may be run on the change tracking stream 202 to determine which rows of the table have been added, deleted, and/or updated between two timestamps. Further, a query may be run on the change tracking stream 202 to determine a comprehensive change tracking summary between two timestamps, wherein the comprehensive change tracking summary indicates all intermediate modifications that have occurred on the table between two timestamps.

In an embodiment, the change tracking stream 202 is advanced sequentially such that each change tracking entry pertains to a transaction that occurred on the table. The change tracking entries are ordered chronologically according to transaction timestamps.

In an embodiment, the table versions each represent a new table version after data is ingested into a database. In an embodiment, data is continuously ingested into a first table by way of an auto ingestion service. The data in the first table may need to be merged with data in a second table while the data is being ingested into the first table. In an embodiment, the data may be copied periodically into the first table and further split into multiple other tables.

Figure 3:
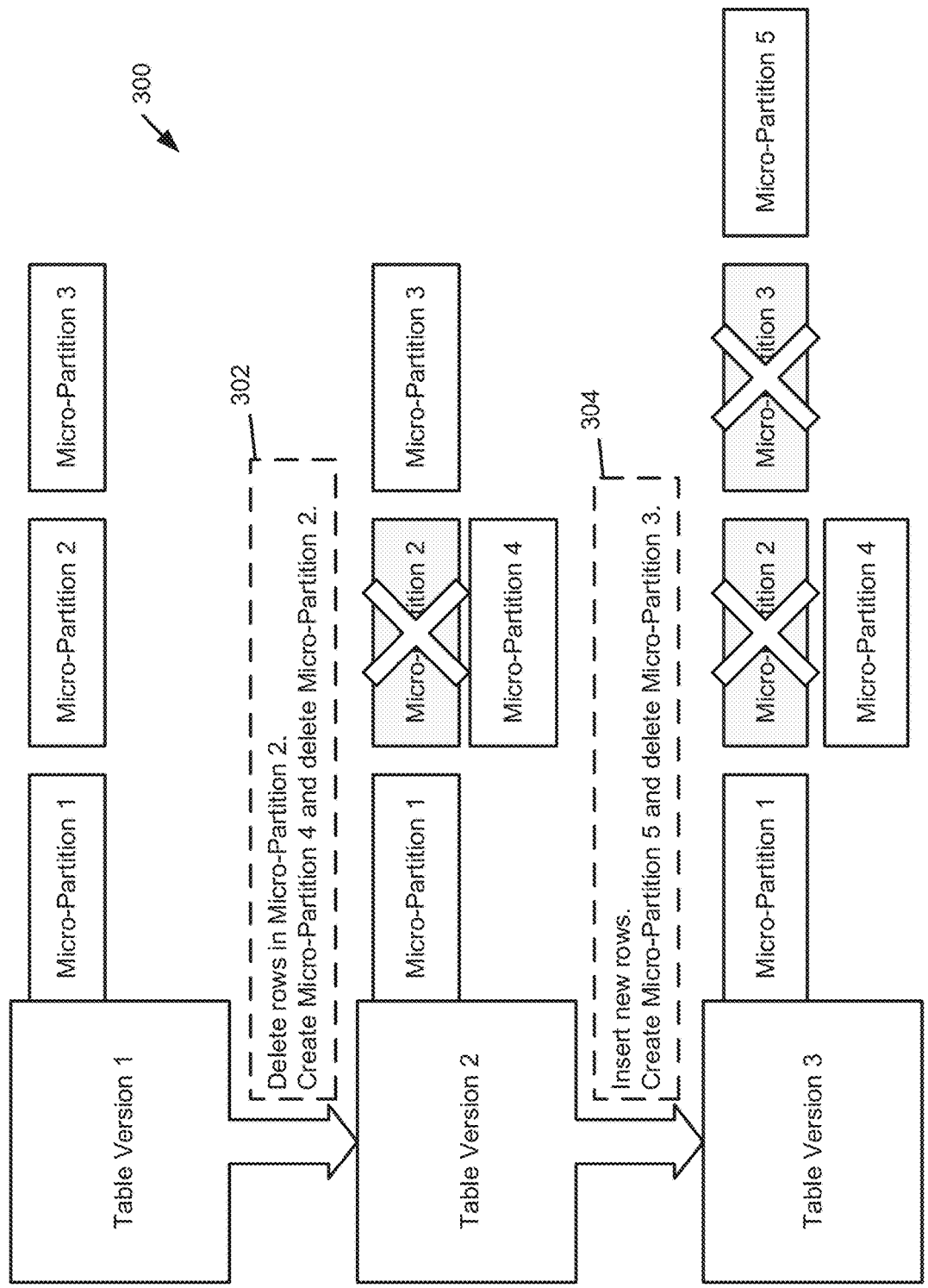
FIG. 3 is a block diagram illustrating modifications made to table versions, according to one embodiment.

FIG. 3 illustrates a schematic block diagram of a table history 300 with multiple table versions. The example table history 300 illustrates three table versions, namely table version 1, table version 2, and table version 3. Table version 1 includes data in the form of three micro-partitions (MPs), namely micro-partition 1 (MP1), micro-partition 2 (MP2), and micro-partition 3 (MP3). A first transaction 302 is executed on table version 1 to generate table version 2. The first transaction 302 includes deleting rows in MP2 to generate a new micro-partition 4 (MP4) and deleting the original MP2. The first transaction 302 executed on table version 1 generates table version 2 which includes the original MP1 and MP3 along with the newly generated MP4. As a result of the first transaction 302, MP2 has been removed from the table as reflected in table version 2. A second transaction 304 is executed on table version 2 to generate table version 3. The second transaction 304 includes inserting new rows such that micro-partition 5 (MP5) is generated and MP3 is removed from the table. Table version 3 includes the original MP1, the MP4 generated as a result of the first transaction 302, and MP5 generated as a result of the second transaction 304. The MP2 was removed as a result of the first transaction 302 and the MP3 was removed from the table as a result of the second transaction 304.

As illustrated in FIG. 3, a database table may store database data in one or more micro-partitions, wherein the micro-partitions constitute immutable storage devices. When a change or modification is executed on the table, the affected micro-partitions are removed, and new micro-partitions are created that reflect the change. In an embodiment, the original unmodified micro-partition is not removed but is also stored with the new micro-partition. The change may include any command that impacts one or more rows in the table, including for example, a delete command, an insert command, an update command, and/or a merge command.

In an embodiment, a comprehensive change tracking summary may be determined that indicates all changes that have been made between, for example, table version 1 and table version 3. A comprehensive change tracking summary for the implementation illustrated in FIG. 1 will indicate that a first transaction 302 caused rows to be deleted from MP2 and caused MP4 to be generated without those rows. The summary will further indicate that a second transaction 304 caused new rows to be inserted into the table, caused MP3 to be removed, and caused MP5 to be generated with those new rows. The comprehensive change tracking summary indicates all transactions that occur on the table, when those transactions occurred, and how those transactions impacted the table.

In an embodiment, a table history is updated only if a transaction is fully completed. Therefore, if a transaction is initiated but is not fully completed, the table history will not be updated to include that transaction. For example, if a transaction is initiated to delete certain rows of an original micro-partition, a new micro-partition will be generated that includes all original rows in the original micro-partition except for those that should be deleted based on a delete command. If the transaction is not completed, i.e. if the new micro-partition is not fully generated, then the table history will not be updated to indicate that the transaction occurred.

In an embodiment, the stream concept may be applied not only to table streams but also to query execution in general. Similar to streams that can provide a delta between two timestamps for table data by logically comparing the data during query execution, a stream can provide a delta between the result of a query at two different transactional timestamps.

Figure 4:
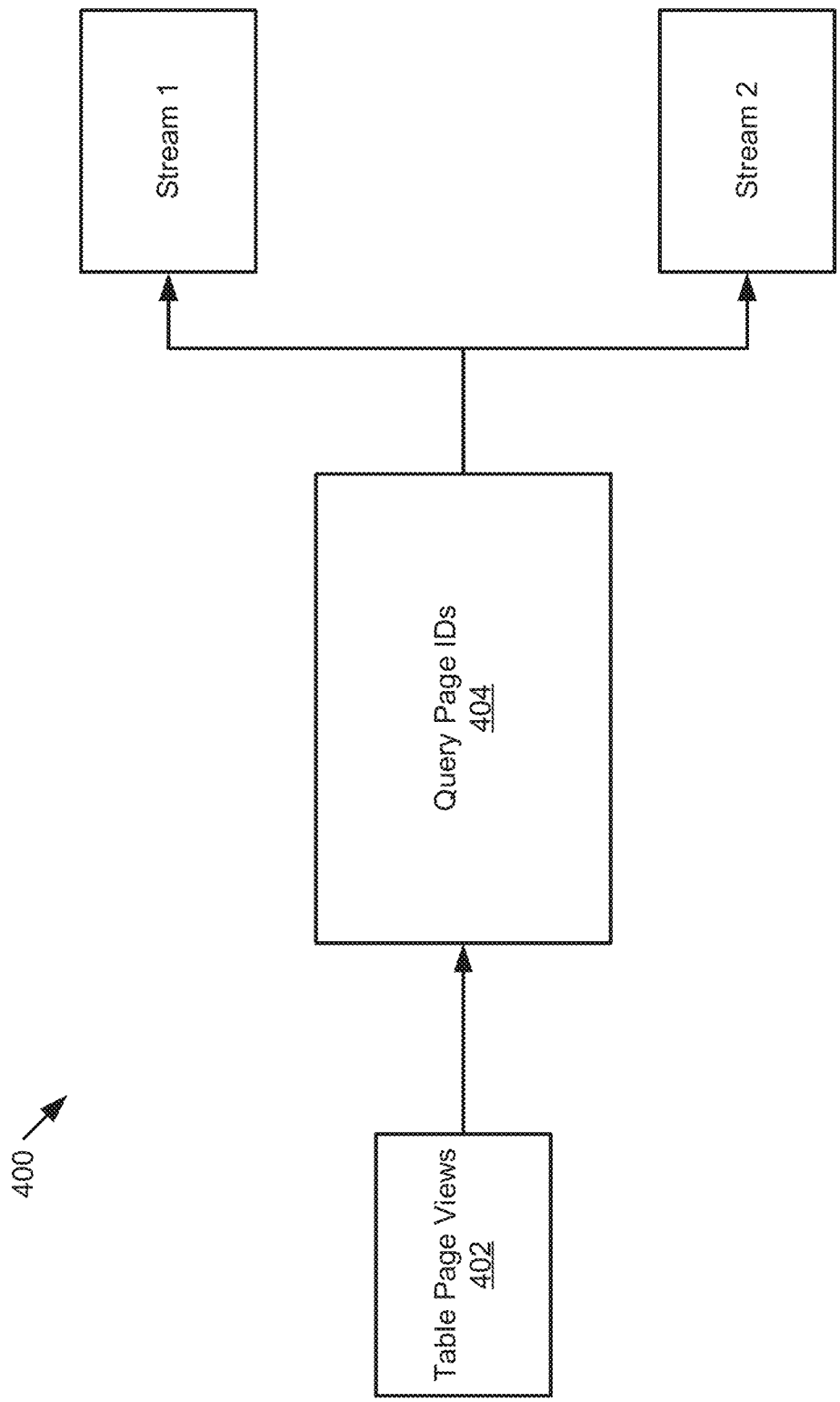
FIG. 4 is a block diagram of a query pipeline, according to one embodiment.

FIG. 4 illustrates a schematic block diagram of a query pipeline 400 example. In the query pipeline 400, the table page_views 402 may be manipulated with one or more transactions, such as an insert, a delete, merge, or an update. Most commonly, the table page_views 402 is populated with insert statements as data is ingested into a database. The query_page ids 404 represents a continuous query that generates results accordingly as the table page_views 402 is populated with transactions. The query_page ids 404 is used to generate one or more streams. In the implementation illustrated in FIG. 4, the query_page ids 404 generates two streams, namely stream 1 and stream 2. Stream 1 and stream 2 are positioned at different points in the query flow and will return a different set of records when queried.

Figure 5:
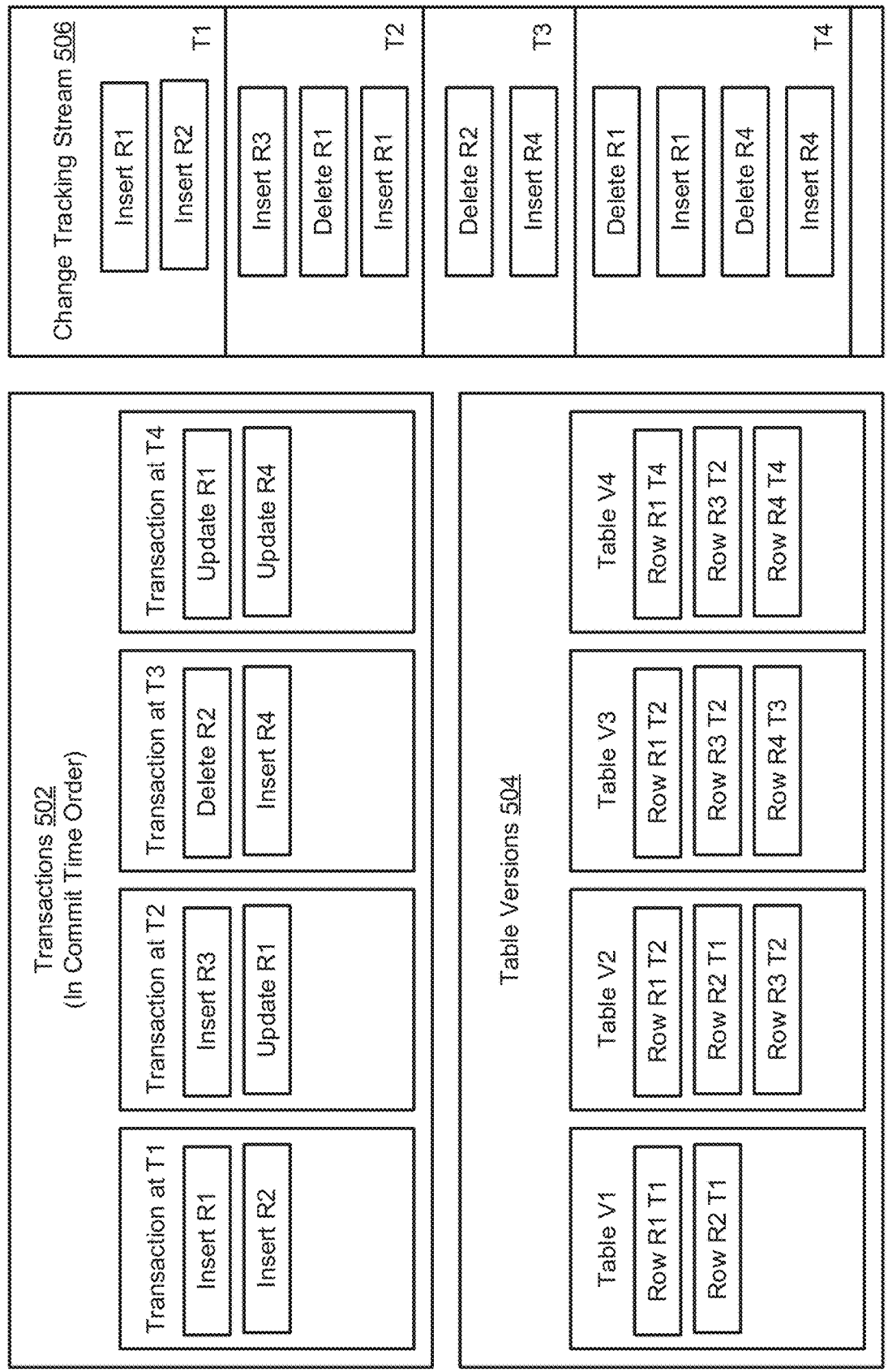
FIG. 5 is a block diagram of a change tracking stream, according to one embodiment.

FIG. 5 illustrates a schematic block diagram of an example change tracking stream 506. The change tracking stream 506 is generated based on a series of transactions 502, namely transaction at (timestamp) T1, transaction at (timestamp) T2, transaction at (timestamp) T3, and transaction at (timestamp) T4 that are ordered based on a commit time timestamp. The transactions 502 generate a series of table versions 504, namely table V1, table V2, table V3, and table V4. The change tracking stream 506 is updated at timestamp T1, timestamp T2, timestamp T3, and timestamp T4 as illustrated in FIG. 5.

As illustrated, the transaction at T1 includes inserting R1 (i.e. row identification number 1) and inserting R2. The table V1 includes row R1 at timestamp T1 and row R2 at timestamp T1. The transaction at T2 includes inserting R3 and updating R1. The table V2 includes row R1 at timestamp T2, row R2 at timestamp T1, and row R3 at timestamp T2. The transaction at T3 includes deleting R2 and inserting R4. The table V3 includes row R1 at timestamp T2, row R3 at timestamp T2, and row R4 at timestamp T3. The transaction at T4 includes updating R1 and updating R4. The table V4 includes row R1 at timestamp T4, row R3 at timestamp T2, and row R4 at timestamp T4.

The change tracking stream 506 includes a change tracking entry at timestamp T1 that indicates R1 and R2 were inserted into the table. The change tracking entry at timestamp T2 indicates R3 and R1 were inserted into the table and R1 was deleted from the table. The change tracking entry at timestamp T3 indicates R2 was deleted from the table and R4 was inserted into the table. The timestamp at T4 indicates R1 and R4 were deleted from the table while R1 and R4 were inserted into the table.

The change tracking stream 506 is a transactional container and maintains the current (i.e. latest) temporal point that a transaction has been executed on the database table and also maintains knowledge about which table version(s) can be safely discarded. The change tracking stream 506 serves as a building block supporting a task and/or query pipeline as illustrated in FIG. 1. The change tracking stream 506 is implemented by introducing stable row identification values (e.g. micro-partition name and micro-partition row number) that are maintained during a DML statement. The change tracking entries may be retrieved from the table by leveraging a stream object that will track the transactional point of time the modifications may be retrieved starting from.

In an embodiment, a task is executed at 112 in a transaction and the change tracking stream 102 will only advance if the transaction commits. This permits exactly once behavior regarding consuming the changes from the change tracking stream 102. The task schedule may indicate that the task should be initiated after a predefined time period after the change tracking stream 506 has data to consume. In an example implementation, the task schedule indicates that the task should be executed after 100 seconds since the last execution of a transaction that caused the change tracking stream 506 to be advanced. In an example implementation, the task schedule indicates that the task should be executed after at least 100 modified rows have been captured in the change tracking stream 506.

The utilization of the change tracking stream 506 may permit a user to retrieve results of a query or task in a reliable manner even in case of session loss or other service errors. This provides significant benefits over other implementations known in the art for executing tasks, logic, or queries on a database table.

Figure 6:
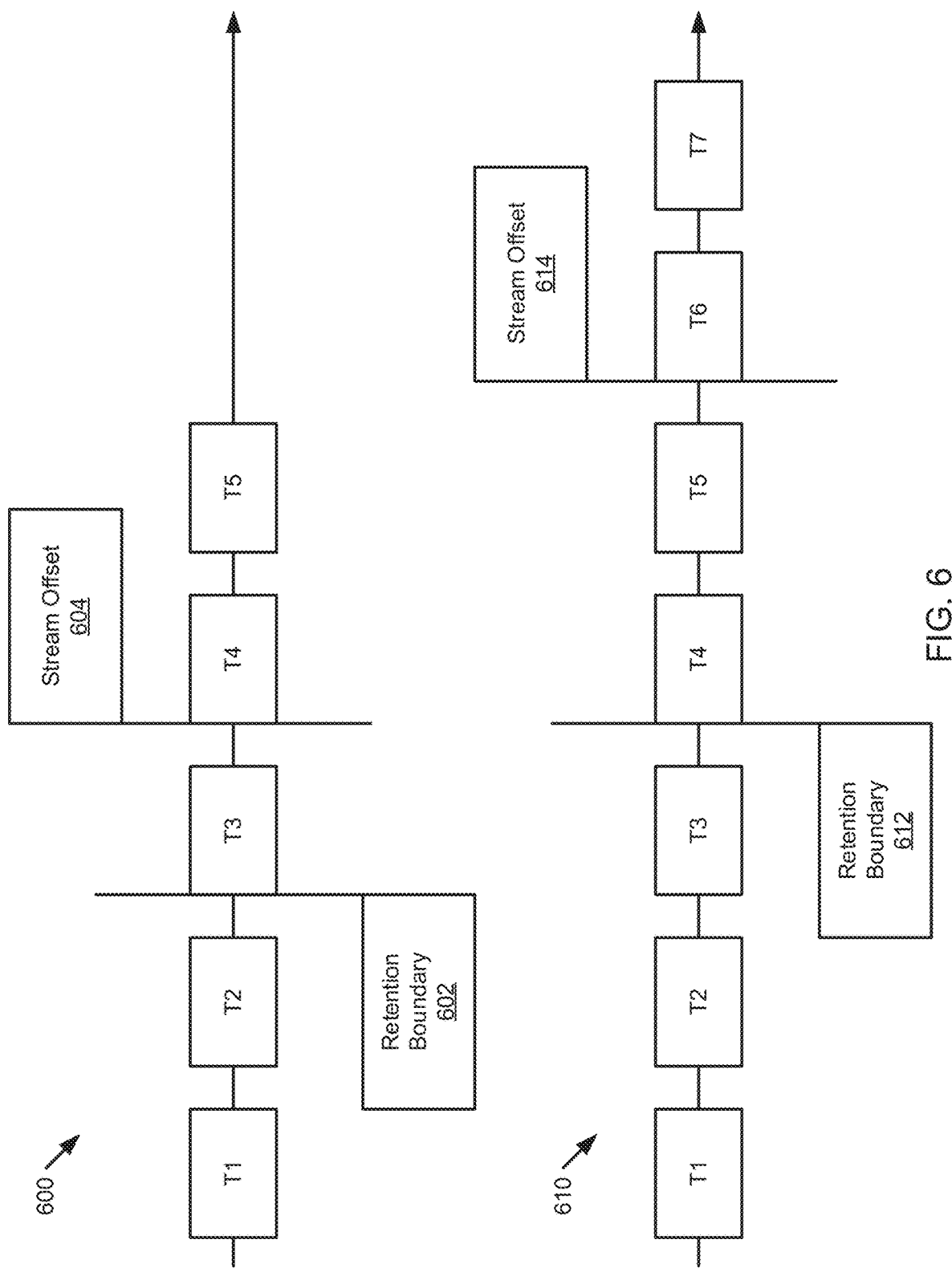
FIG. 6 is a schematic diagram of transactional timelines for database data, according to one embodiment.

FIG. 6 illustrates a first transactional timeline 600 and a second transactional timeline 610 of a database table. The database table undergoes a series of transactions, including transactions T1, T2, T3, T4, T5, T6, and T7. The change tracking stream 506 maintains a timestamp offset in the transaction timeline 600, 610 of the table. In an embodiment, when the change tracking stream 506 is requested, the changeset interval begins at the last read timestamp and the end interval is the current transactional commit time of the table. In an embodiment, given the retention period for any given table, the retention boundary 602 may be the "earliest" timestamp the stream offset 604 can take. When the change tracking stream 506 is initialized on a table it may select the current transactional timestamp as the offset (i.e. the beginning of the changeset interval which is T4 as illustrated in the first transaction timeline 600). The changeset of rows returned form the change tracking stream 506 in this case is the delta information generated by the transactions T4 and T5. When the stream offset is advanced to T6 as the second transactional timeline 610, the retention boundary 612 and the stream offset 614 are shifted such that reading the changeset will return the deltas produced by transactions T6 and T7.

In an embodiment, the change tracking stream 506 may be available as a system table valued function that includes the table name, the start timestamp, and optionally end transactional time values of the changeset interval. The stream offset 604, 614 of the change tracking stream 506 may be transactionally saved to allow for independent stream processing. The change tracking stream 506 may be a first-class schema object that is linked to an underlying table object and supports transactional manipulation of the offset it maintains. In an embodiment, the change tracking stream 506 includes the same columns as the table it is generated upon, including additional METADATA$ACTION and METADATA$ISUPDATE columns that indicate the action (i.e. insert or delete), and whether this was part of an update for the rows returned when queried out of the stream, respectively.

In an embodiment, when the change tracking stream 506 is generated on a table it will initialize the offset to the current table version. The change tracking stream 506 will support SELECT operations similar to tables and views but may not support explicit DML operations in some embodiments. A query may be run on the change tracking stream 506 to return a set of modifications from a current stream offset up to the current transactional time of the source table. When used in an auto commit statement, the change tracking stream 506 may automatically advance the internal stream offset to the transactional time the query was run (if the query or transaction did not fail). When run in an explicit multi-statement transaction, the change tracking stream 506 may select the transaction time of the start time of the transactions as the upper bound for the transactional interval of changes to be returned starting with the offset as the lower bound. The change tracking stream 506 will not advance the stream offset until a transaction is fully committed, meaning that multiple statements may retrieve the changeset from the change tracking stream 506. Because the upper bound may be set by the transactional start time if DML statements modify tables, inside the transaction the modifications will not reflect in the changeset retrieved from the change tracking stream 506.

FIG. 7 illustrates a block diagram of an example delete command 700 and a resulting delta 710 that may be returned after the delete command 700 is complete. Micro-partition 2 (MP2) as illustrated in FIG. 7 includes four columns. Column 1 includes entries for row numbers that are primarily used for identification purposes. Column 2 includes entries for row values that may include any value depending on the subject or purpose of the database table. The metadata name column includes table history information about which micro-partition the data originated from or was last located within. The metadata row column includes table history information about which row the data originated from or was located within.

As illustrated in FIG. 7, the delete command 700 is performed on MP2 and deletes rows 2 and 3 from MP2 to generate the new MP4. As an example, as illustrated in FIG. 2, MP2 includes four rows—namely rows 1, 2, 3, and 4. It should be appreciated that a micro-partition may include any number of rows and may often include thousands of rows in a single micro-partition. The values for each of the rows in MP2 are listed as value1, value2, value3, and value4 for the four rows by way of example but it should be appreciated the value may include any suitable value as pertinent to the database. In the original and unmodified MP2, the metadata name for each of the four rows is "NULL (MP2)" indicating the data is original to that micro-partition and does not yet have any change history. Similarly, the metadata row column for MP2 is NULL and indicates the original row number because the data is original to MP2 and does not yet have a change tracking history.

MP4 is generated based on the delete command 700 performed on MP2 that deleted rows 2 and 3 as illustrated in FIG. 7. MP4 now only includes rows 1 and 4 having values value1 and value4, respectively. The metadata name for each of rows 1 and 4 is "MP2" indicating the row data originated or was last located within MP2. The metadata row for each of rows 1 and 4 is 1 and 4, respectively, indicating where the rows were last located.

A delta 710 may be determined after the delete command 700 is performed on a table. In an embodiment, a timestamp is attached to each transaction that occurs on the table. If the transaction is fully completed, then the timestamp is further attached to the change tracking history for that transaction. Attaching the timestamp to the change tracking history enables the system to know when a table was changed by a certain transaction and when a certain change occurred on any of a plurality of rows in the table.

The delta 710 illustrated in FIG. 7 determines a difference or a change that occurred between MP2 and MP4. In various embodiments the delta 710 may determine a total change that has occurred between any two timestamps, even if many transactions have occurred on the data between those two timestamps and the data has been changed multiple times. The delta 710 provides an indication of a total change between two timestamps without providing information on any intermediate changes that occurred between a first timestamp and a second timestamp.

The delta 710 includes four columns, namely a column 1 and column 2 (similar to those shown in MP2 and MP4) along with a metadata action column and a metadata is update column. Column 1 indicates that rows 2 and 3 have been altered between the first timestamp and the second timestamp. Column 2 indicates that the values of rows 2 and 3 are value2 and value3, respectively. In various embodiments, where the values of rows 2 and 3 may have changed one or more times between the first timestamp and the second timestamp, Column 2 may indicate the original value or the most recent value. The metadata action column indicates that rows 2 and 3 underwent a DELETE command. The metadata is update column indicates whether the metadata was updated. In the delta 710 illustrated in FIG. 7, the metadata is update column returns a FALSE because the rows did not undergo an update (but were instead deleted).

In an embodiment, a table history is generated that includes all transactions that have been initiated against the table. Such transactions may include, for example, data manipulation language (DML) commands such as delete, insert, merge, or update commands initiated on a micro-partition. The table history may be dynamically updated to reflect all deleted or inserted rows on table for an interval of transaction time. The table history may include a list of DML statements sorted by transaction time, where each transaction includes a timestamp. In an embodiment, it is assumed that all DML statements will delete, insert, and/or update rows at the same time, and this may be accomplished by undergoing a MERGE statement.

In an embodiment, a table history may be determined by retrieving a list of added and removed micro-partitions between two transactions. For each given micro-partition, a lineage sequence of dependencies may be generated that indicates which rows have been updated, how those rows were updated, and what transaction caused each update. A delta may be determined by requesting a changeset between two timestamps in the lineage. The delta may return a listing of all added micro-partitions and all removed micro-partitions between the two timestamps. The listing may be consolidated by removing those micro-partitions that appear on both the list of added micro-partitions and on the list of removed micro-partitions. This may be accomplished by performing an outer join on the lists of added and removed micro-partitions.

Further in an embodiment, a row granularity list of changes may be determined between any two transaction times for a given table. A side-by-side representation may be generated that may be easily used in a merge statement by checking which part of data is present. A table valued function may be utilized to query the table history for a given table (or a materialized view). Further, a SQL statement may be utilized by referring the INSERTED or DELETED columns in a changeset to return an indication of which rows in the table have been inserted or deleted.

FIG. 8 illustrates a block diagram of an example insert command 800 and a resulting delta 810 that may be returned after the insert command 800 is complete. FIG. 8 begins with an exemplary micro-partition 3 (MP3) that undergoes an insert command 800 to generate micro-partition 5 (MP5). The insert command 800 inserts rows 17 and 18 into MP3. As an example, embodiment, MP3 includes three rows, namely rows 21, 22, and 23 having values of value21, value22, and value23, respectively. The metadata name for is NULL (MP3) for each of the three rows because there is not yet a change tracking history for the rows that indicates where the rows originated or were last stored. The NULL (VALUE) notation indicates that the values for the metadata columns are NULL when rows are first inserted into the table but the columns have an implicit VALUE which is used when the row is copied into a new partition. The NULL values can reduce overhead. When values for a row are copied into a new micro-partition, the rank of the row is notated in the NULL(ROW NUMBER) notation. In such an implementation, the NULL(ROW NUMBER) notation for the first row is 1, the second row is 2, the third row is 3, and so forth.

MP5 is generated based on the insert command 800 and now includes rows 17 and 18. The values for rows 17 and 18 are value17 and value18, respectively, because rows 17 and 18 were inserted into MP5 and those are the assigned values for the rows. The values for rows 21, 22, and 23 have not changed. The metadata name information for rows 21, 22, and 23 is "MP3" because the data originated from or was last stored in micro-partition 3. The metadata row information for rows 21, 22, and 23 is 1, 2, and 3, respectively, because rows 21, 22, and 23 were originally or last stored in rows 1, 2, and 3 in micro-partition 3. The metadata name information and the metadata row information for rows 17 and 18 is "NULL" because the rows originated in MP5 and do not yet have any change tracking history information.

The delta 810 for the insert command 800 illustrates the total change made between a first timestamp and a second timestamp. As illustrated in FIG. 8, the delta 810 illustrates the change that occurred between MP5 and MP3. It should be appreciated that in alternative embodiments or implementations, a delta may indicate a total change or modification that occurred on a table between any two timestamps without indicating incremental changes that occurred on the table.

The delta 810 includes rows 17 and 18 having value17 and value18, respectively because rows 17 and 18 were added to MP3 because of the insert command 800. The metadata action is "INSERT" for rows 17 and 18 because an insert command 800 was the transaction that caused a modification to the rows. The metadata is update information is "FALSE" for rows 17 and 18 because the rows were not updated but were instead inserted.

FIG. 9 illustrates a block diagram of an example update command 900 and a resulting delta 910 that may be returned after the update command 900 is complete. In the example embodiment illustrated in FIG. 9, micro-partition 78 (MP78) is updated to generate micro-partition 91 (MP91). The update command 900 updates rows 1 and 4 to new values. MP78 includes rows 1, 2, 3, and 4 having values of value1, value2, value3, and value4, respectively. The metadata name information is "NULL (MP78) for each of the rows because there is not yet change tracking history for the rows indicating where the rows were last stored. The metadata row information for each of the rows is NULL because there is not yet change tracking history for the rows indicating which row the values were last stored.

MP91 includes rows 1, 2, 3, and 4. However, due to the update command 900, row 1 now has a value of VALUE11 and row 4 now has a value of VALUE44. The metadata name information for each of rows 1, 2, 3, and 4 is "MP78" because the values originated from or were last stored in MP78. The metadata row information for rows 1 is "1" because that value was last stored in row 1 in MP78. Similarly, for rows 2, 3, and 4, the metadata row information is "2", "3", and "4", respectively.

The delta 910 indicates the change between a first timestamp and a second timestamp. As illustrated in FIG. 9, the delta 910 indicates a total change between MP78 and MP91 due to the update command 900. The delta 910 indicates that rows 1 and 4 that had a value of "value1" and "value2", respectively, were deleted. The delta 910 indicates that rows 1 and 4 that have a value of "VALUE11" and "VALUE44", respectively, were inserted. The metadata is update information is "TRUE" for all rows because an update command 900 was performed on the rows. As indicated in the delta 910, when an update command is performed, the original row is deleted, and a new row is inserted to carry out the command.

In an embodiment, each delta 710, 810, 910 may be utilized to determine a change tracking entry for the table that may be inserted in the change tracking stream. The delta information may be stored as metadata in the change tracking stream in each new micro-partition that is generated in the table. The advancement of the change tracking stream may serve as a trigger event to initiate the execution of a task on the table.

Figure 10:
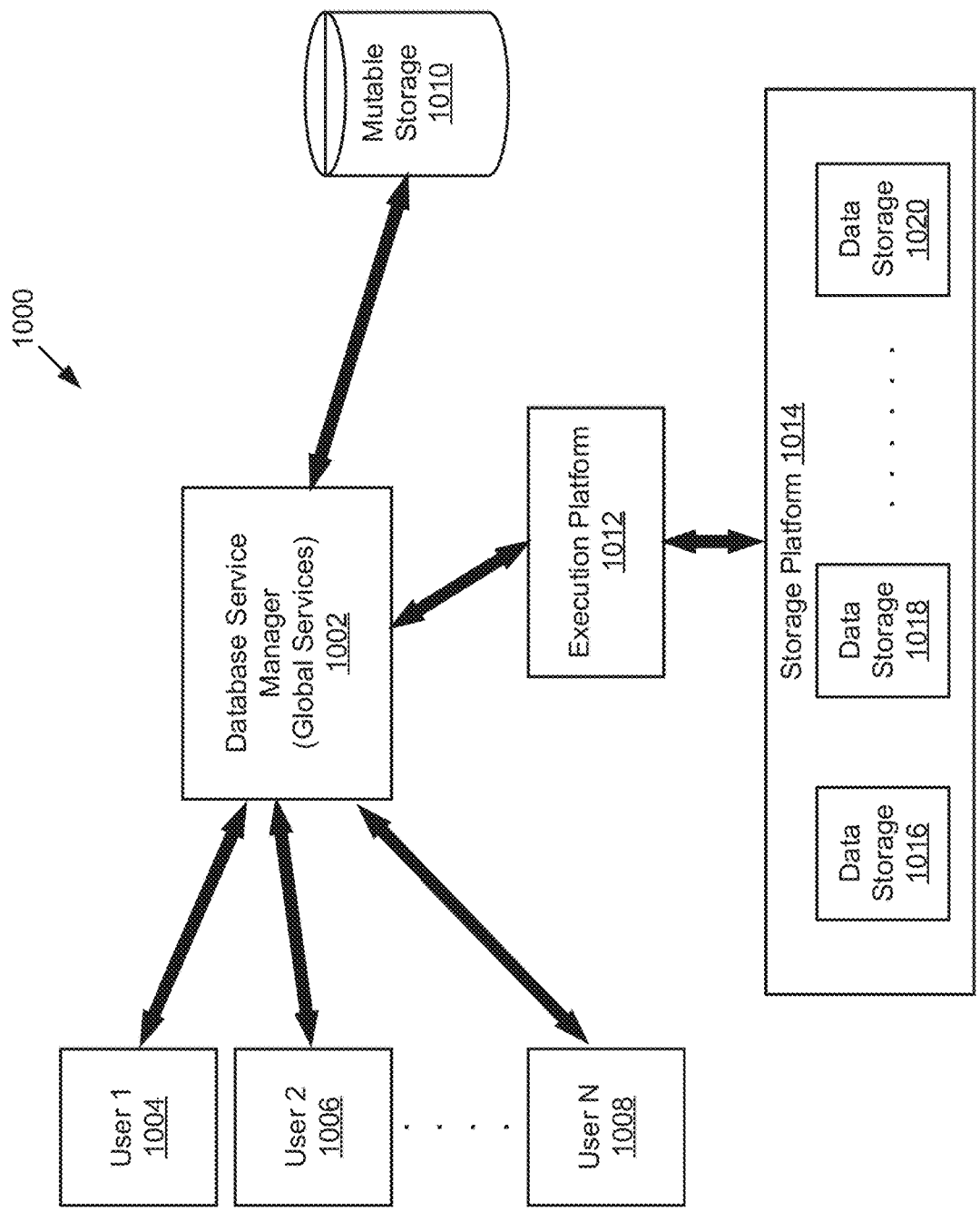
FIG. 10 is a block diagram illustrating a database system having a database service manager, according to one embodiment.

Turning to FIG. 10, a block diagram is shown illustrating a processing platform 1000 for providing database services, according to one embodiment. The processing platform 1000 includes a database service manager 1002 that is accessible by multiple users 1004, 1006, and 1008. The database service manager 1002 may also be referred to herein as a resource manager or global services. In some implementations, database service manager 1002 can support any number of users desiring access to data or services of the processing platform 1000. Users 1004-1008 may include, for example, end users providing data storage and retrieval queries and requests, system administrators managing the systems and methods described herein, software applications that interact with a database, and other components/devices that interact with database service manager 1002. In a particular embodiment as illustrated herein, the users 1004-1008 may initiate changes to database data and may request a delta for a database table.

The database service manager 1002 may provide various services and functions that support the operation of the systems and components within the processing platform 1000. Database service manager 1002 has access to stored metadata associated with the data stored throughout data processing platform 1000. The database service manager 1002 may use the metadata for optimizing user queries. In some embodiments, metadata includes a summary of data stored in remote data storage systems as well as data available from a local cache (e.g., a cache within one or more of the clusters of the execution platform 1012). Additionally, metadata may include information regarding how data is organized in the remote data storage systems and the local caches. Metadata allows systems and services to determine whether a piece of data needs to be processed without loading or accessing the actual data from a storage device.

As part of the data processing platform 1000, metadata may be collected when changes are made to the data using a data manipulation language (DML), which changes may be made by way of any DML statement. Examples of manipulating data may include, but are not limited to, selecting, updating, changing, merging, and inserting data into tables. As part of the processing platform 1000, micro-partitions may be created, and the metadata may be collected on a per file and a per column basis. This collection of metadata may be performed during data ingestion or the collection of metadata may be performed as a separate process after the data is ingested or loaded. In an implementation, the metadata may include a number of distinct values; a number of null values; and a minimum value and a maximum value for each file. In an implementation, the metadata may further include string length information and ranges of characters in strings.

In one embodiment, at least a portion of the metadata is stored in immutable storage such as a micro-partition. For example, the metadata may be stored on the storage platform 1014 along with table data. In one embodiment, the same or separate cloud storage resources that are used for table data may be allocated and used for the metadata. In one embodiment, the metadata may be stored in local immutable storage. In one embodiment, information about the metadata in immutable storage, or information about metadata files stored in immutable storage, is stored in mutable storage 1010. The information about metadata may be referenced for locating and accessing the metadata stored in immutable storage. In one embodiment, systems with metadata storage may be restructured such that the metadata storage is used instead to store information about metadata files located in immutable storage.

Database service manager 1002 is further in communication with an execution platform 1012, which provides computing resources that execute various data storage and data retrieval operations. The execution platform 1012 may include one or more compute clusters. The execution platform 1012 is in communication with one or more data storage devices 1016, 1018, and 1020 that are part of a storage platform 1014. Although three data storage devices 1016, 1018, and 1020 are shown in FIG. 10, the execution platform 1012 is capable of communicating with any number of data storage devices. In some embodiments, data storage devices 1016, 1018, and 1020 are cloud-based storage devices located in one or more geographic locations. For example, data storage devices 1016, 1018, and 1020 may be part of a public cloud infrastructure or a private cloud infrastructure, or any other manner of distributed storage system. Data storage devices 1016, 1018, and 1020 may include hard disk drives (HDDs), solid state drives (SSDs), storage clusters, or any other data storage technology. Additionally, the storage platform 1014 may include a distributed file system (such as Hadoop Distributed File Systems (HDFS), object storage systems, and the like.

In some embodiments, the communication links between database service manager 1002 and users 1004-1008, mutable storage 1010 for information about metadata files (i.e., metadata file metadata), and execution platform 1012 are implemented via one or more data communication networks and may be assigned various tasks such that user requests can be optimized. Similarly, the communication links between execution platform 1012 and data storage devices 1016-1020 in storage platform 1014 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The database service manager 1002, mutable storage 1010, execution platform 1012, and storage platform 1014 are shown in FIG. 10 as individual components. However, each of database service manager 1002, mutable storage 1010, execution platform 1012, and storage platform 1014 may be implemented as a distributed system (e.g., distributed across multiple systems/platforms at multiple geographic locations) or may be combined into one or more systems. Additionally, each of the database service manager 1002, mutable storage 1010, the execution platform 1012, and the storage platform 1014 may be scaled up or down (independently of one another) depending on changes to the requests received from users 1004-1008 and the changing needs of the data processing platform 1000. Thus, in the described embodiments, the data processing platform 1000 is dynamic and supports regular changes to meet the current data processing needs.

Figure 11:
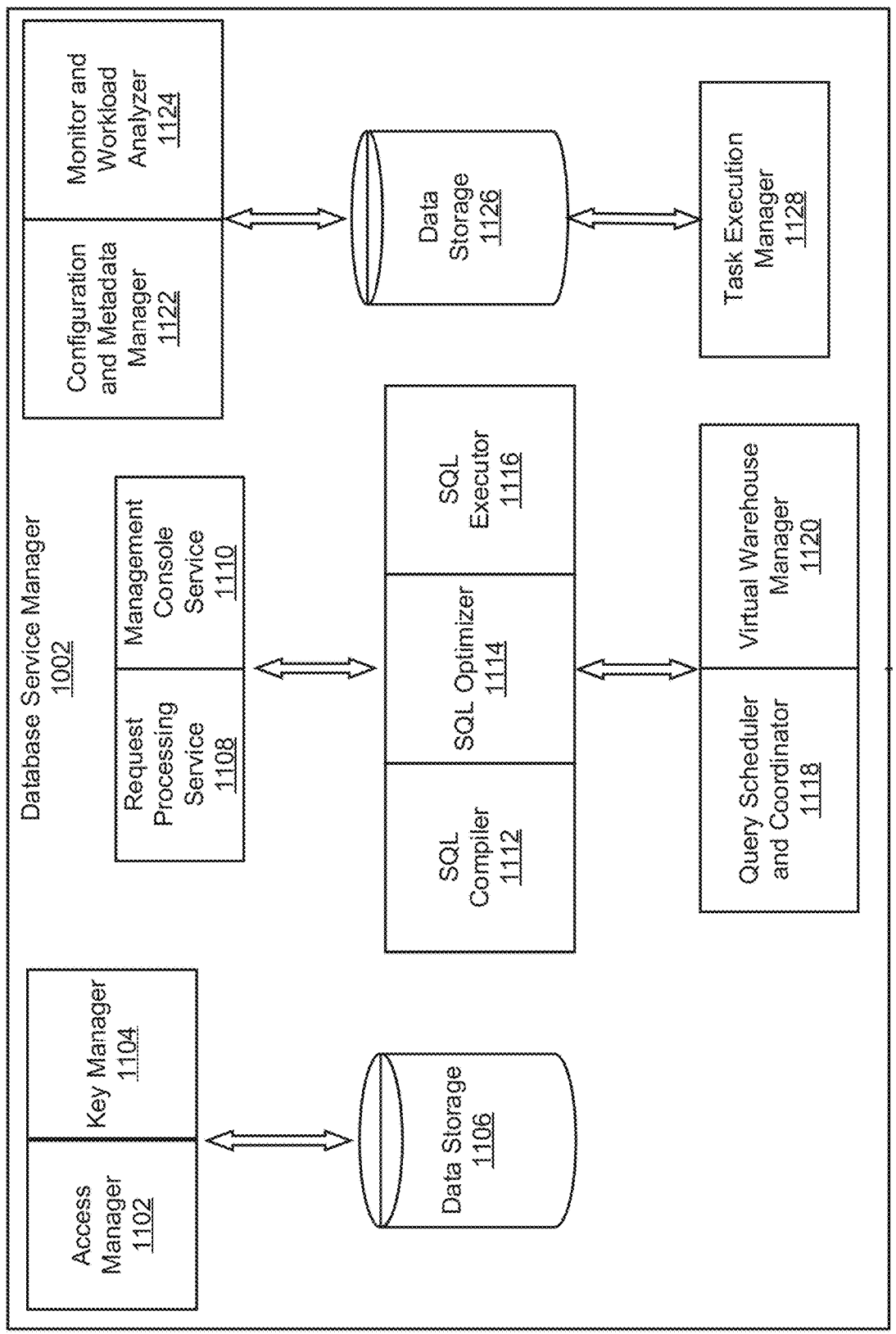
FIG. 11 is a block diagram illustrating components of a database service manager, according to one embodiment.

FIG. 11 illustrates a block diagram depicting components of database service manager 1002, according to one embodiment. The database service manager 1002 includes an access manager 1102 and a key manager 1104 coupled to a data storage device 1106. The access manager 1102 handles authentication and authorization tasks for the systems described herein. The key manager 1104 manages storage and authentication of keys used during authentication and authorization tasks. A request processing service 1108 manages received data storage requests and data retrieval requests. A management console service 1110 supports access to various systems and processes by administrators and other system managers.

The database service manager 1002 also includes an SQL compiler 1112, an SQL optimizer 1114 and an SQL executor 1116. SQL compiler 1112 parses SQL queries and generates the execution code for the queries. SQL optimizer 1114 determines the best method to execute queries based on the data that needs to be processed. SQL executor 1116 executes the query code for queries received by database service manager 1002. A query scheduler and coordinator 1118 sends received queries to the appropriate services or systems for compilation, optimization, and dispatch to an execution platform 1112. A virtual warehouse manager 1120 manages the operation of multiple virtual warehouses.

Additionally, the database service manager 1002 includes a task execution manager 1128, which manages the information related to the data stored in the remote data storage devices and in the local caches. A monitor and workload analyzer 1124 oversees the processes performed by the database service manager 1002 and manages the distribution of tasks (e.g., workload) across the virtual warehouses and execution nodes in the execution platform 1012. Task execution manager 1128 and monitor and workload analyzer 1124 are coupled to a data storage device 1126. In one embodiment, the configuration and metadata manager 1122 collects, stores, and manages metadata in an immutable storage resource. In one embodiment, updates to metadata result in new files and are not updated in place.

Metadata files, as discussed herein, may include files that contain metadata of modifications (e.g., each modification) to any database table in a data warehouse. A modification of a database table may generate one or more metadata files, often just a single metadata file. In one embodiment, metadata files contain the following information: information about a metadata file, including a version number; a list of all added table data files; a list of deleted table data files; and information about each added table data file, including file path, file size, file key id, as well as summaries of all rows and columns that are stored in the table data file.

In one embodiment, the contents of metadata files may vary over time. If format or content of a metadata file changes, the version number of the metadata file may be incremented. In one embodiment, the metadata store (or other mutable data storage resource) only stores information about metadata files (which are stored in immutable storage), not about table data files. In practice, information about metadata files stored in in the metadata store (or other mutable storage) is very limited and may contain data for thousands of metadata files. In one embodiment, information for up to 30,000 metadata files may be stored in metadata store or other mutable storage. This dramatically reduces the amount of storage needed in the metadata store or other mutable storage.

In one embodiment, a system writes metadata files to cloud storage for every modification of a database table (e.g., modification of table data files). In addition to adding and deleting files, every modification to a database table in the data warehouse also generates one or more metadata files. Typically, a modification creates a single metadata file. However, if the modification to the table is large (e.g., an insert into a table that produces very many files), it may result in the creation of multiple metadata files. Further operation of the task execution manager 1128 will be discussed further in relation to FIGS. 6-12.

The database service manager 1002 also includes a task execution manager 1128, which manages the scheduling and execution of one or more tasks on database data, wherein the tasks may include user-defined logic such as a SQL statement. Because multiple users/systems may access the same data simultaneously, changes to the data may be synchronized to ensure that each user/system is working with the current version of the data and has access to a change tracking history for the data.

Security improvements are also implemented in some embodiments. In one embodiment, metadata files and change tracking information is encrypted using individual file keys. Within a micro-partition, columns may be encrypted individually using AES-CTR mode with different start counters. This allows a database system to read an individual column from a micro-partition because it can be decrypted without needing to decrypt the whole micro-partition at once. Encryption improves security because nobody can read the micro-partition without having the proper file key.

For verification that a micro-partition has not been altered, the system may store hashes of columns for each column within the micro-partition. Before decrypting the data, the system compares the hash of the encrypted column with the stored hash of the column of this micro-partition. If the hashes do not match, the micro-partition must have been altered. This improves security because all altering of micro-partitions is detected by the database system.

Figure 12:
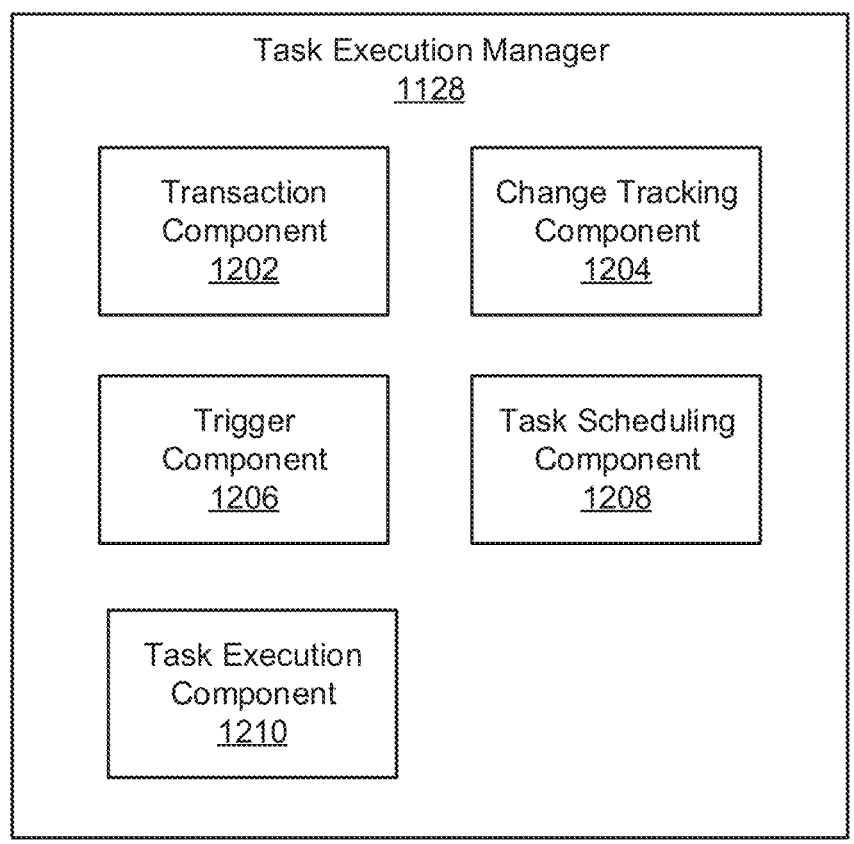
FIG. 12 is a block diagram illustrating components of a task execution manager, according to one embodiment.

FIG. 12 is a schematic block diagram illustrating components of a task execution manager 1128, according to one embodiment. The task execution manager 1128 may manage the scheduling and execution of one or more tasks on database table data. The task execution manager 1128 includes a transaction component 1202, a change tracking component 1204, a trigger component 1206, a task scheduling component 1208, and a task execution component 1210. The components 1202-1210 are given by way of illustration only and may not all be included in all embodiments. In fact, some embodiments may include only one or any combination of two or more of the components 1202-1210. For example, some of the components may be located outside or separate from the task execution manager 1128, such as within a database service manager 1002 or processing platform 1000. Furthermore, the components 1202-1210 may comprise hardware, computer readable instructions, or a combination of both to perform the functionality and provide the structures discussed herein.

The transaction component 1202 executes one or more transactions on a table of a database, wherein the table includes database data. The transaction may include any DML command such as an insert, delete, update, and/or merge command. In an embodiment, the transaction component 1202 executes a transaction on a micro-partition of a database table by generating a new micro-partition that reflects the transaction and removing the (original) micro-partition. A single transaction may impact multiple rows of database data across multiple micro-partitions and may therefore cause multiple new micro-partitions to be generated. In an embodiment, the transaction component 1202 never executes a transaction by modifying database data in-place and instead generates a new immutable storage device such as a micro-partition.

The transaction component 1202 further generates and stores transaction data for each transaction that is executed on a table. The transaction component 1202 may associate the transaction data with a new micro-partition such that the transaction data is stored as metadata for the new micro-partition. Such transaction data may include, for example, an identity of a user or account that initiated a DML or SQL statement, when the transaction was requested, when the transaction was initiated, when the transaction was completed, how the transaction impacted the table, what rows and/or micro-partitions were modified by the transaction, and so forth.

The change tracking component 1204 generates and stores change tracking information concerning transactions that have been executed on a database table. The change tracking information may be stored in one or more change tracking entries that form a lineage of modification information in a change tracking stream. The change tracking component 1204 may store the change tracking information as metadata on immutable storage such as a micro-partition, may be stored in local mutable storage, and/or may be stored within the table data as a change tracking stream, for example. In one embodiment, the change tracking information may be stored and updated in-place. In one embodiment, the change tracking information is stored within an immutable micro-partition in a change tracking stream indicating a most recent change that occurred on a row and/or a log of changes that have occurred on the table. In an embodiment, the change tracking component 1204 secures a timestamp to a transaction that occurred on the table and further secures the timestamp to an associated change tracking entry in a change tracking stream.

The trigger component 1206 determines one or more event triggers that may be associated with a task to be executed on a database. The trigger component 1206 may further determine if a trigger event is satisfied and a task should therefore be executed on the database. The trigger component 1206 may receive an indication of a trigger event from a client account and/or may automatically generate a trigger event based on predefined rules.

The task scheduling component 1208 schedules tasks to be executed on a database based on one or more trigger events. In an embodiment, the task scheduling component 1208 schedules that a task must be executed on all newly ingested data while it is stored in a staging table 110 prior to being stored in a final target table.

The task execution component 1210 executes one or more tasks on database data. The task execution component 1210 may initiate a task in response to the trigger component 1206 determining that a trigger event has been satisfied. The task may include user-defined logic such as a SQL statement that is received from a client account. The task may manipulate database data as it is ingested into the database to ensure the data is in the correct shape to be stored in a target table. The task may include, for example, the continuous or automatic querying of database data.

Figure 13:
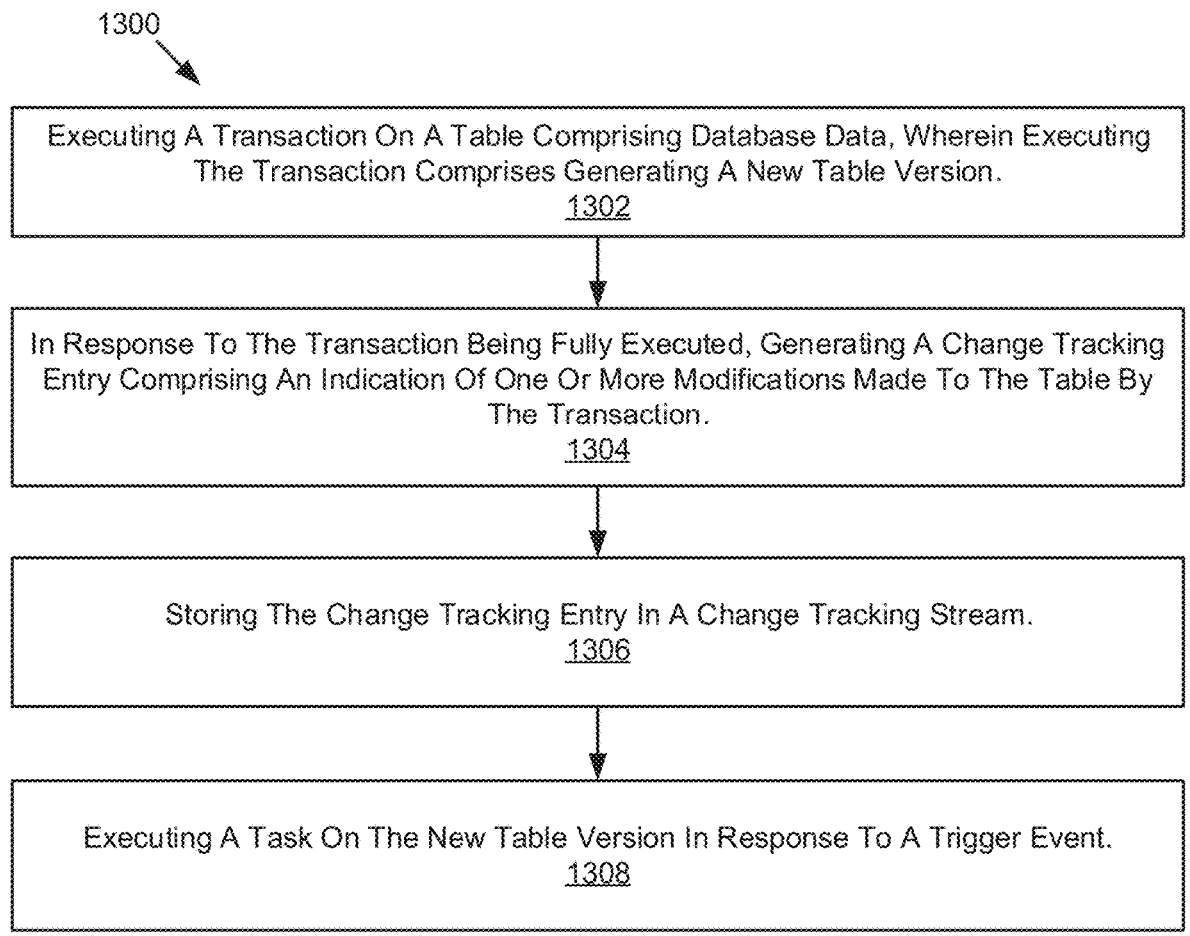
FIG. 13 is a schematic flow chart diagram illustrating a method for scheduling tasks on database data, according to one embodiment.

FIG. 13 is a schematic flow chart diagram illustrating an example method 1300 for scheduling a task to be executed on a database. The method 1300 may be performed by a task execution manager 1128, database service manager 1002, processing platform 1000, and/or other service or platform.

The method 1300 begins and a computing device executes at 1302 a transaction on a table comprising database data, wherein executing the transaction comprises generating a new table version. The computing device, in response to the transaction being fully executed, generates at 1304 a change tracking entry comprising an indication of one or more modifications made to the table by the transaction. The computing device stores at 1306 the change tracking entry in a change tracking stream. The computing device executes at 1308 a task on the new table version in response to a trigger event.

Figure 14:
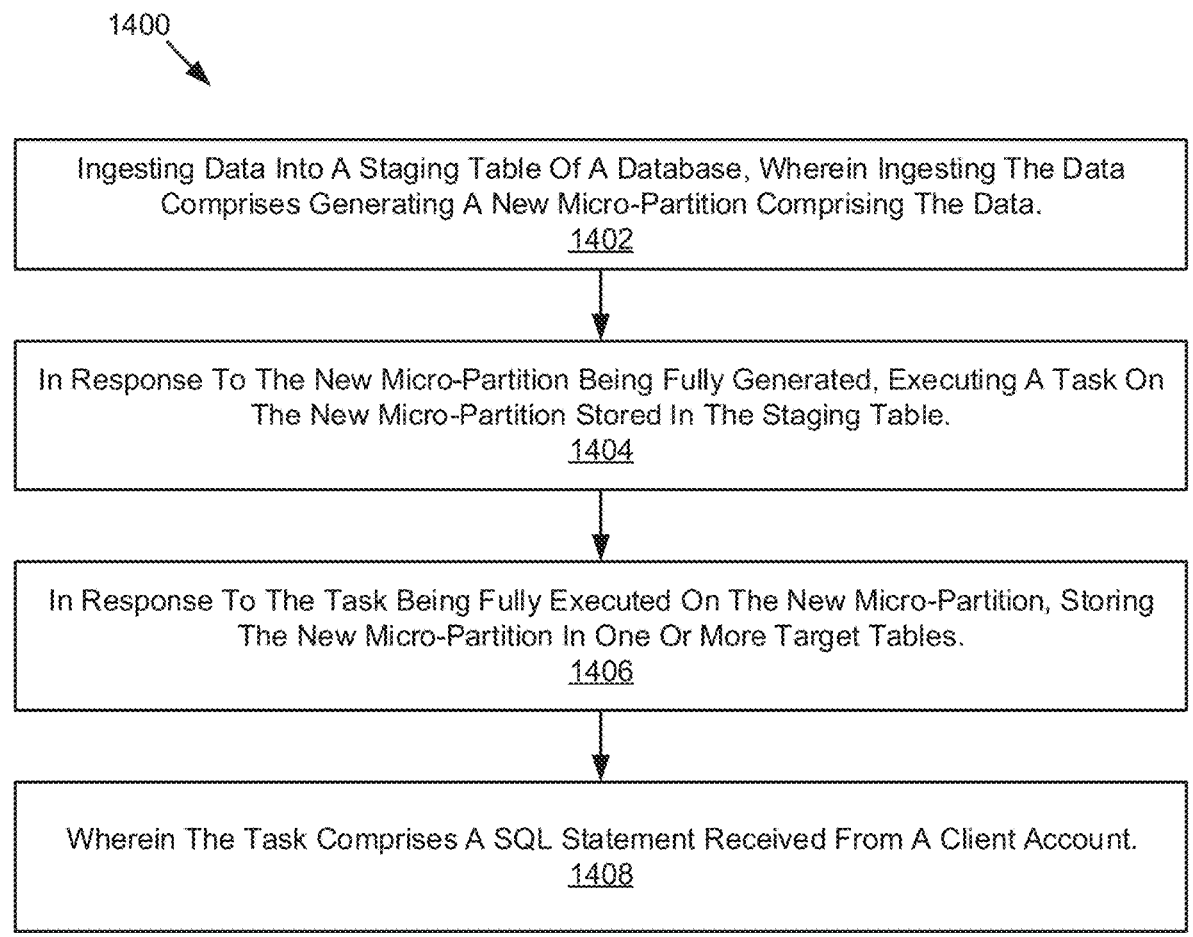
FIG. 14 is a schematic flow chart diagram illustrating a method for scheduling tasks on database data, according to one embodiment.

FIG. 14 is a schematic flow chart diagram illustrating an example method 1400 for scheduling a task to be executed on a database. The method 1400 may be performed by a task execution manager 1128, database service manager 1002, processing platform 1000, and/or other service or platform.

The method 1400 begins and a computing device ingests at 1402 data into a staging table of a database, wherein ingesting the data comprises generating a new micro-partition comprising the data. The computing device, in response to the new micro-partition being fully generated, executes at 1404 a task on the new micro-partition stored in the staging table. The computing device, in response to the task being fully executed on the new micro-partition, stores at 1406 the new micro-partition in one or more target tables. The method 1400 is such that the task comprises a SQL statement received from a client account (see 1408).

Figure 15:
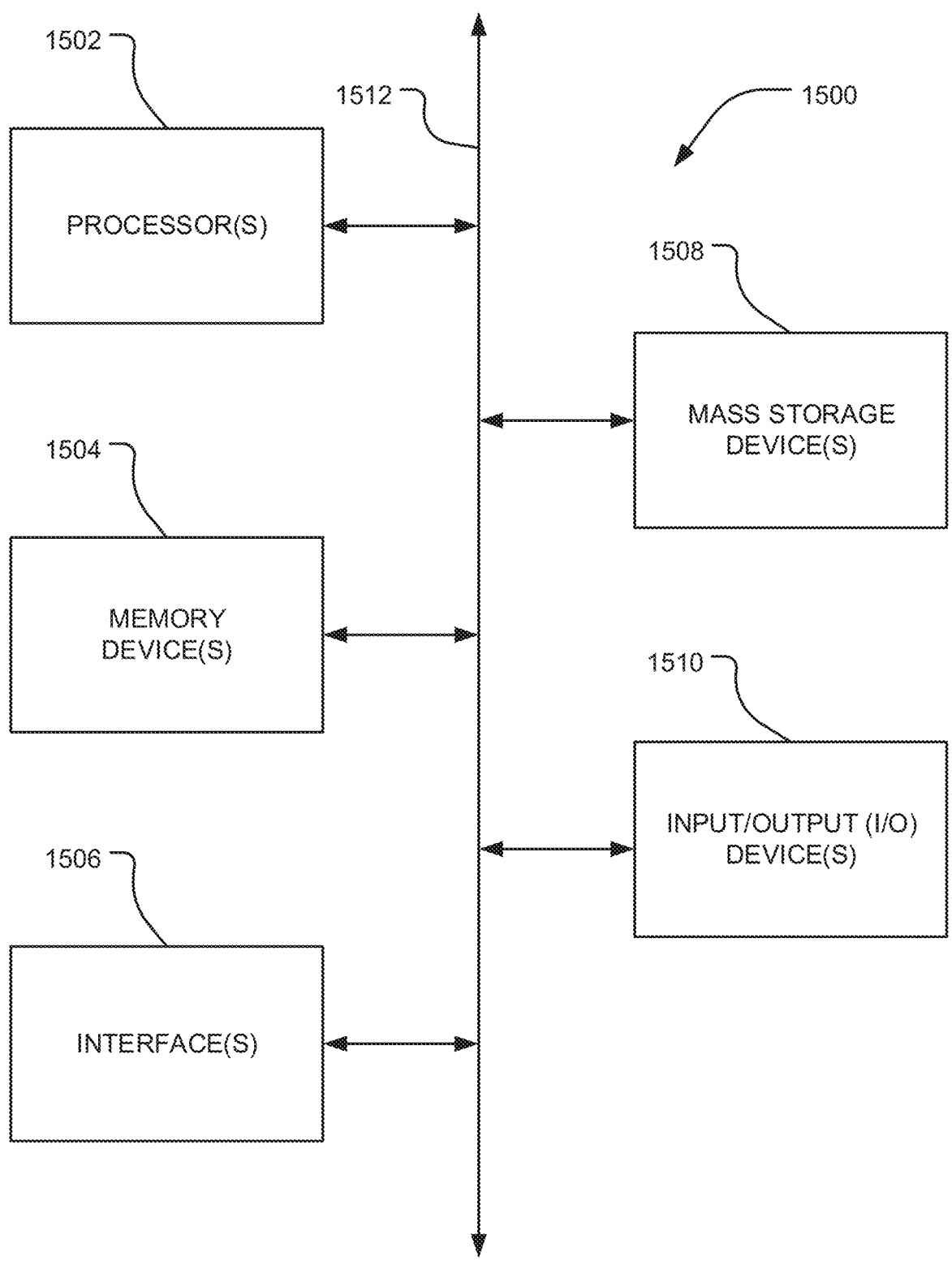
FIG. 15 is a block diagram depicting an example computing device consistent with at least one embodiment of processes and systems disclosed herein.

FIG. 15 is a block diagram depicting an example computing device 1500. In some embodiments, computing device 1500 is used to implement one or more of the systems and components discussed herein. For example, computing device 1500 may include or be part of a task execution manager 1128, a database service manager 1002, a processing platform 1000, and/or any other components or systems discussed herein. As another example, the components, systems, or platforms discussed herein may include one or more computing devices 1500. Further, computing device 1500 may interact with any of the systems and components described herein. Accordingly, computing device 1500 may be used to perform various procedures and tasks, such as those discussed herein. Computing device 1500 can function as a server, a client or any other computing entity. Computing device 1500 can be any of a wide variety of computing devices, such as a desktop computer, a notebook computer, a server computer, a handheld computer, a tablet, and the like.

Computing device 1500 includes one or more processor(s) 1502, one or more memory device(s) 1504, one or more interface(s) 1506, one or more mass storage device(s) 1508, and one or more Input/Output (I/O) device(s) 1510, all of which are coupled to a bus 1512. Processor(s) 1502 include one or more processors or controllers that execute instructions stored in memory device(s) 1504 and/or mass storage device(s) 1508. Processor(s) 1502 may also include various types of computer-readable media, such as cache memory.

Memory device(s) 1504 include various computer-readable media, such as volatile memory (e.g., random access memory (RAM)) and/or nonvolatile memory (e.g., read-only memory (ROM)). Memory device(s) 1504 may also include rewritable ROM, such as Flash memory.

Mass storage device(s) 1508 include various computer readable media, such as magnetic tapes, magnetic disks, optical disks, solid state memory (e.g., Flash memory), and so forth. Various drives may also be included in mass storage device(s) 1508 to enable reading from and/or writing to the various computer readable media. Mass storage device(s) 1508 include removable media and/or non-removable media.

I/O device(s) 1510 include various devices that allow data and/or other information to be input to or retrieved from computing device 1500. Example I/O device(s) 1510 include cursor control devices, keyboards, keypads, microphones, monitors or other display devices, speakers, printers, network interface cards, modems, lenses, CCDs or other image capture devices, and the like.

Interface(s) 1506 include various interfaces that allow computing device 1500 to interact with other systems, devices, or computing environments. Example interface(s) 1506 include any number of different network interfaces, such as interfaces to local area networks (LANs), wide area networks (WANs), wireless networks, and the Internet.

Bus 1512 allows processor(s) 1502, memory device(s) 1504, interface(s) 1506, mass storage device(s) 1508, and I/O device(s) 1510 to communicate with one another, as well as other devices or components coupled to bus 1512. Bus 1512 represents one or more of several types of bus structures, such as a system bus, PCI bus, USB bus, and so forth.

EXAMPLES

The following examples pertain to further embodiments.

Example 1 is a method for scheduling a task to be executed on a database. The method includes executing a transaction on a table comprising database data, wherein executing the transaction comprises generating a new table version. The method includes, in response to the transaction being fully executed, generating a change tracking entry comprising an indication of one or more modifications made to the table by the transaction and storing the change tracking entry in a change tracking stream. The method includes executing a task on the new table version in response to a trigger event.

Example 2 is a method as in Example 1, wherein the transaction comprises ingesting new data into the table and wherein the method further comprises: storing the new table version in a staging table prior to executing the task on the new table version; and in response to the task being executed, transitioning the new table version to one or more target tables.

Example 3 is a method as in any of Examples 1-2, further comprising advancing a stream offset in the change tracking stream in response to the change tracking entry being stored in the change tracking stream, and wherein the trigger event is the advancing of the stream offset.

Example 4 is a method as in any of Examples 1-3, wherein the trigger event comprises one or more of: a predefined time period, a threshold number of modifications made to the table; the storing of the change tracking entry in the change tracking stream, or the storing of the change tracking entry in the change tracking stream plus a predefined time period.

Example 5 is a method as in any of Examples 1-4, wherein the table comprises one or more micro-partitions storing database data, and wherein executing the transaction on the table comprises generating at least one new micro-partition that reflects the transaction and removing at least one corresponding micro-partition of the one or more micro-partitions.

Example 6 is a method as in any of Examples 1-5, wherein the transaction comprises one or more of an insert of data into the table, a deletion of data in the table, or an update of data in the table.

Example 7 is a method as in any of Examples 1-6, wherein the change tracking entry further comprises one or more of: a timestamp when the transaction was requested, a timestamp when the transaction was fully executed, an identifier of a user or account that requested the transaction, or a minimum and maximum data value pair for data inserted by the transaction.

Example 8 is a method as in any of Examples 1-7, wherein the task comprises user-defined logic comprising one or more structured query language (SQL) statements.

Example 9 is a method as in any of Examples 1-8, wherein the change tracking stream is transactional such that the change tracking stream advances only after the transaction is fully and successfully executed, and wherein the task is executed on the new table version in a transactional manner such that the task is executed on the new table version only one time.

Example 10 is a method as in any of Examples 1-9, further comprising, in response to executing the task on the new table version, generating a task history entry comprising one or more of: a task name, a task identification, an execution timestamp indicating when the task was executed, an execution status indicating whether the task was successfully executed or whether an error was returned, a message comprising an error code in response to the task not being executed successfully, or one or more results returned by executing the task.

Example 11 is a method as in any of Examples 1-10, further comprising retrieving the task from database schema, wherein the task comprises one or more of: a timestamp indicating when the task was received or generated, a task name, a database name indicating which database the task should be executed on, an identifier of an owner or creator of the task, a schedule for the task comprising the trigger event, a structure query language (SQL) script, a last execution timestamp indicating a last time the task was executed, or a last execution status indicating whether the task was run successfully the last time the task was executed.

Example 12 is a system for scheduling a task to be executed on a database. The system includes means for executing a transaction on a table comprising database data, wherein executing the transaction comprises generating a new table version. The system includes means for generating a change tracking entry comprising an indication of one or more modifications made to the table by the transaction in response to the transaction being fully executed. The system includes means for storing the change tracking entry in a change tracking stream. The system includes means for executing a task on the new table version in response to a trigger event.

Example 13 is a system as in Example 12, wherein the transaction comprises ingesting new data into the table and wherein the system further comprises: means for storing the new table version in a staging table prior to execution of the task on the new table version; and means for transitioning the new table version to one or more target tables in response to the task being executed.

Example 14 is a system as in any of Examples 12-13, further comprising means for advancing a stream offset in the change tracking stream in response to the change tracking entry being stored in the change tracking stream, and wherein the trigger event is the advancing of the stream offset.

Example 15 is a system as in any of Examples 12-14, wherein the trigger event comprises one or more of: a predefined time period, a threshold number of modifications made to the table, the storing of the change tracking entry in the change tracking stream, or the storing of the change tracking entry in the change tracking stream plus a predefined time period.

Example 16 is a system as in any of Examples 12-15, wherein the table comprises one or more micro-partitions storing database data, and wherein the means for executing the transaction on the table is configured to generate at least one new micro-partition that reflects the transaction and removing at least one corresponding micro-partition of the one or more micro-partitions.

Example 17 is a system as in any of Examples 12-16, wherein the change tracking stream is transactional such that the change tracking stream advances only after the transaction is fully and successfully executed, and wherein the task is executed on the new table version in a transactional manner such that the data the task accesses is retrieved only one time.

Example 18 is non-transitory computer readable storage media storing instructions that, when executed by one or more processors, cause the one or more processors to: execute a transaction on a table comprising database data, wherein executing the transaction comprises generating a new table version; in response to the transaction being fully executed, generate a change tracking entry comprising an indication of one or more modifications made to the table by the transaction; store the change tracking entry in a change tracking stream; and execute a task on the new table version in response to a trigger event.

Example 19 is non-transitory computer readable storage media as in Example 18, wherein the transaction comprises ingesting new data into the table and wherein the instructions further cause the one or more processors to: store the new table version in a staging table prior to executing the task on the new table version; and in response to the task being executed, transition the new table version to one or more target tables.

Example 20 is non-transitory computer readable storage media as in any of Examples 18-19, wherein the instructions further cause the one or more processors to advance a stream offset in the change tracking stream in response to the change tracking entry being stored in the change tracking stream, and wherein the trigger event is the advancing of the stream offset.

Example 21 is non-transitory computer readable storage media as in any of Examples 18-20, wherein the trigger event comprises one or more of: a predefined time period, a threshold number of modifications made to the table, the storing of the change tracking entry in the change tracking stream, or the storing of the change tracking entry in the change tracking stream plus a predefined time period.

Example 22 is non-transitory computer readable storage media as in any of Examples 18-21, wherein the table comprises one or more micro-partitions storing database data, and wherein the instructions cause the one or more processors to execute the transaction on the table by generating at least one new micro-partition that reflects the transaction and removing at least one corresponding micro-partition of the one or more micro-partitions.

Example 23 is non-transitory computer readable storage media as in any of Examples 18-22, wherein the change tracking stream is transactional such that the change tracking stream advances only after the transaction is fully and successfully executed, and wherein the task is executed on the new table version in a transactional manner such that the task is executed on the new table version only one time.

Example 24 is an apparatus including means to perform a method as in any of Examples 1-23.

Example 25 is a machine-readable storage including machine-readable instructions that, when executed, implement a method or realize an apparatus of any of Examples 1-23.

The flow diagrams and block diagrams herein illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein provide a flexible and scalable data warehouse using new data processing platforms, methods, systems, and algorithms. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

In the described systems and methods, a data storage system utilizes an SQL (Structured Query Language)-based relational database. However, these systems and methods are applicable to any type of database using any data storage architecture and using any language to store and retrieve data within the database. The systems and methods described herein may also provide a multi-tenant system that supports isolation of computing resources and data between different customers/clients and between different users within the same customer/client.

Various techniques, or certain aspects or portions thereof, may take the form of program code (i.e., instructions) embodied in tangible media, such as floppy diskettes, CD-ROMs, hard drives, a non-transitory computer readable storage medium, or any other machine readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

What is claimed is:

1. A method comprising:
executing a transaction on a table comprising one or more immutable micro-partitions storing database data, the executing of the transaction comprising generating a new table version on a new micro-partition, the new table version including updated database data that reflects the transaction;
in response to the transaction being fully executed, generating a change tracking entry distinct from the new table, comprising an indication of one or more modifications made to the table by the transaction;
entering the change tracking entry into a change tracking stream;
executing a task, distinct from the transaction, on the new table version;
querying the change tracking stream to determine whether the table can be discarded; and
discarding the table based on a determination that a query result from the change tracking stream indicates the table can be discarded.

2. The method of claim 1, wherein the transaction comprises ingesting new data into the table, the method further comprising:
storing the new data in a staging table; and
transforming the new data in the staging table for storage in one or more target tables.

3. The method of claim 1, further comprising advancing a stream offset in the change tracking stream in response to the change tracking entry being entered into in the change tracking stream.

4. The method of claim 1, further comprising:
removing at least one immutable micro-partition of the one or more immutable micro-partitions including database data prior to execution of the transaction.

5. The method of claim 1, wherein the transaction comprises one or more of an insertion of data into the table, a deletion of data from the table, and an update of data in the table.

6. The method of claim 1, wherein the change tracking entry further comprises one or more of:
a timestamp indicating when the transaction was requested;
a timestamp indicating when the transaction was fully executed;
an identifier of a user that requested the transaction;
an identifier of an account that requested the transaction; and
a minimum and maximum data value pair for data inserted by the transaction.

7. The method of claim 1, wherein the task comprises user-defined logic comprising one or more structured query language (SQL) statements.

8. The method of claim 1, wherein:
the change tracking stream advances after the transaction is fully and successfully executed; and
the task is executed on the new table version once.

9. The method of claim 1, further comprising, in response to executing the task on the new table version, generating a task history entry comprising one or more of:
a task name;
a task identification;
an execution timestamp indicating when the task was executed;
an execution status indicating whether the task was successfully executed or whether an error was returned;
a message comprising an error code in response to the task not being executed successfully; and
one or more results returned by executing the task.

10. The method of claim 1, further comprising retrieving the task from database schema, wherein the task comprises one or more of:
a timestamp indicating when the task was received;
a timestamp indicating when the task was generated;
a task name;
a database name indicating the database the task is to be executed;
an identifier of an owner of the task;
an identifier of a creator of the task;
a task schedule for the task;
a structured query language (SQL) script;
a last execution timestamp indicating a last time the task was executed; and
a last execution status indicating whether the task was executed successfully the last time the task was executed.

11. A system comprising:
at least one processor; and
one or more non-transitory computer readable storage media containing instructions that, when executed by the at least one processor, cause the at least one processor to perform the operations comprising:
executing a transaction on a table comprising one or more immutable micro-partitions storing database data, the executing of the transaction comprising generating a new table version on a new micro-partition, the new table version including updated database data that reflects the transaction;
generating a change tracking entry in response to the transaction being fully executed, the change tracking entry being distinct from the new table and comprising an indication of one or more modifications made to the table by the transaction;
entering the change tracking entry into a change tracking stream;
executing a task on the new table version;
querying the change tracking stream for determining the table can be discarded; and
discarding the table based on a determination that a query result from the change tracking stream indicates the table can be discarded.

12. The system of claim 11, wherein the transaction comprises ingesting new data into the table, the system further comprising:
storing the new data in a staging table; and
transforming the new data in the staging table for storage in one or more target tables.

13. The system of claim 11, further comprising advancing a stream offset in the change tracking stream in response to the change tracking entry being entered into in the change tracking stream.

14. The system of claim 11, further comprising:
removing at least one immutable micro-partition of the one or more immutable micro-partitions including database data prior to execution of the transaction.

15. The system of claim 11, wherein:
the change tracking stream advances after the transaction is fully and successfully executed; and
the task is executed on the new table version once.

16. Non-transitory computer readable storage media storing instructions that, when executed by one or more processors, cause the one or more processors to perform operations comprising:
executing a transaction on a table comprising one or more immutable micro-partitions storing database data, the executing of the transaction comprising generating a new table version on a new micro-partition, the new table version including updated database data that reflects the transaction;
in response to the transaction being fully executed, generating a change tracking entry distinct from the new table, comprising an indication of one or more modifications made to the table by the transaction;
entering the change tracking entry into a change tracking stream;
executing a task on the new table version;
querying the change tracking stream for determining the table can be discarded; and
discarding the table based on a determination that a query result from the change tracking stream indicates the table can be discarded.

17. The non-transitory computer readable storage media of claim 16, wherein the transaction comprises ingesting new data into the table, the operations further comprising:
storing the new data in a staging table; and
transforming the new data in the staging table for storage in one or more target tables.

18. The non-transitory computer readable storage media of claim 16, the operations further comprising advancing a stream offset in the change tracking stream in response to the change tracking entry being entered into in the change tracking stream.

19. The non-transitory computer readable storage media of claim 16, further comprising:
removing at least one immutable micro-partition of the one or more immutable micro-partitions including database data prior to execution of the transaction.

20. The non-transitory computer readable storage media of claim 16, wherein:
the change tracking stream advances after the transaction is fully and successfully executed; and
the task is executed on the new table version once.

21. The method of claim 1, further comprising advancing a stream offset in the change tracking stream after a determination that the transaction fully commits.

22. The system of claim 11, further comprising advancing a stream offset in the change tracking stream after a determination that the transaction fully commits.

23. The computer readable storage media of claim 16, the operations further comprising advancing a stream offset in the change tracking stream after a determination that the transaction fully commits.

24. A system comprising:
one or more processors; and
data storage containing instructions executable by the one or more processors to perform operations comprising:
executing a transaction on a table comprising one or more immutable micro-partitions storing database data, the executing of the transaction comprising generating a new table version on a new micro-partition, the new table version including updated database data that reflects the transaction;
in response to the transaction being fully executed, generating a change tracking entry distinct from the new table, comprising an indication of one or more modifications made to the table by the transaction;
entering the change tracking entry into a change tracking stream;
executing a task on the new table version;
querying the change tracking stream for determining the table can be discarded; and
discarding the table based on a determination that a query result from the change tracking stream indicates the table can be discarded.

25. The system of claim 24, wherein the transaction comprises ingesting new data into the table, the operations further comprising:
storing the new data in a staging table; and
transforming the new data in the staging table for storage in one or more target tables.

26. The system of claim 24, the operations further comprising advancing a stream offset in the change tracking stream in response to the change tracking entry being entered into in the change tracking stream.

27. The system of claim 24, further comprising:
removing at least one immutable micro-partition of the one or more immutable micro-partitions including database data prior to execution of the transaction.

28. The system of claim 24, wherein the transaction comprises one or more of an insertion of data into the table, a deletion of data from the table, and an update of data in the table.

29. The system of claim 24, wherein the change tracking entry further comprises one or more of:
a timestamp indicating when the transaction was requested;
a timestamp indicating when the transaction was fully executed;
an identifier of a user that requested the transaction;
an identifier of an account that requested the transaction; and
a minimum and maximum data value pair for data inserted by the transaction.

30. The system of claim 24, wherein the task comprises user-defined logic comprising one or more structured query language (SQL) statements.

31. The system of claim 24, wherein:
the change tracking stream advances after the transaction is fully and successfully executed; and
the task is executed on the new table version once.

32. The system of claim 24, the operations further comprising, in response to executing the task on the new table version, generating a task history entry comprising one or more of:
a task name;
a task identification;
an execution timestamp indicating when the task was executed;
an execution status indicating whether the task was successfully executed or whether an error was returned;
a message comprising an error code in response to the task not being executed successfully; and
one or more results returned by executing the task.

33. The system of claim 24, the operations further comprising retrieving the task from database schema, wherein the task comprises one or more of:
- a timestamp indicating when the task was received;
- a timestamp indicating when the task was generated;
- a task name;
- a database name indicating the database the task is to be executed;
- an identifier of an owner of the task;
- an identifier of a creator of the task;
- a task schedule for the task;
- a structured query language (SQL) script;
- a last execution timestamp indicating a last time the task was executed; and
- a last execution status indicating whether the task was executed successfully the last time the task was executed.

34. The system of claim 24, the operations further comprising advancing a stream offset in the change tracking stream after a determination that the transaction fully commits.

\* \* \* \* \*